(12) United States Patent
Matsuyuki et al.

(10) Patent No.: US 11,098,218 B2
(45) Date of Patent: Aug. 24, 2021

(54) COATINGS FOR ELECTRONIC DEVICES

(71) Applicant: Apple Inc., Cupertino, CA (US)

(72) Inventors: Naoto Matsuyuki, Kasugai (JP);
Manish Mittal, San Jose, CA (US);
Matthew S. Rogers, San Jose, CA (US)

(73) Assignee: APPLE INC., Cupertino, CA (US)

( * ) Notice: Subject to any disclaimer, the term of this patent is extended or adjusted under 35 U.S.C. 154(b) by 427 days.

(21) Appl. No.: 16/362,455

(22) Filed: Mar. 22, 2019

(65) Prior Publication Data
US 2020/0095449 A1 Mar. 26, 2020

Related U.S. Application Data

(60) Provisional application No. 62/736,646, filed on Sep. 26, 2018.

(51) Int. Cl.
*C09D 127/18* (2006.01)
*C09D 171/02* (2006.01)
*G06F 3/041* (2006.01)

(52) U.S. Cl.
CPC ......... *C09D 127/18* (2013.01); *C09D 171/02* (2013.01); *G06F 3/041* (2013.01)

(58) Field of Classification Search
CPC ...... C09D 127/18; C09D 127/02; G06F 3/041
USPC ........... 345/173; 362/615; 359/463; 428/142
See application file for complete search history.

(56) References Cited

U.S. PATENT DOCUMENTS

| 5,512,374 A | 4/1996 | Wallace et al. |
|---|---|---|
| 6,861,134 B1 | 3/2005 | Peters |
| 9,056,988 B2 | 6/2015 | Decker et al. |
| 9,359,261 B2 | 6/2016 | Bellman et al. |
| 9,586,858 B2 | 3/2017 | Bellman et al. |
| 9,718,249 B2 | 8/2017 | Kwong |
| 9,725,357 B2 | 8/2017 | Adib et al. |
| 2009/0197048 A1* | 8/2009 | Amin ...................... C03C 17/30 428/142 |
| 2009/0218127 A1* | 9/2009 | Fujita ................... C25D 7/0614 174/389 |
| 2012/0327568 A1 | 12/2012 | Shedletsky et al. |

(Continued)

FOREIGN PATENT DOCUMENTS

| CN | 1871378 | 11/2006 |
|---|---|---|
| CN | 101689338 | 3/2010 |

(Continued)

OTHER PUBLICATIONS

Kim et al., "Ultrathin Cross-Linked Perfluoropolyether Film Coatings from Liquid $CO_2$ and Subsequent UV Curing," Chem. Matter, vol. 22, pp. 2411-2413, 2010.

(Continued)

*Primary Examiner* — Prabodh M Dharia

(74) *Attorney, Agent, or Firm* — Brownstein Hyatt Farber Schreck, LLP

(57) ABSTRACT

Patterned and plasma-treated coatings for surfaces of electronic devices are disclosed. The patterned and plasma-treated coatings may include a linear fluorinated oligomer or linear fluorinated polymer and may be transparent. Regions of a patterned coating may be micro-sized. The pattern defined by the coating may not be visually discernable, but may affect the frictional properties of the coating.

20 Claims, 23 Drawing Sheets

(56) References Cited

U.S. PATENT DOCUMENTS

| | | | |
|---|---|---|---|
| 2013/0108840 A1* | 5/2013 | Ivanov | H01B 1/24 428/195.1 |
| 2013/0209762 A1 | 8/2013 | Damm et al. | |
| 2015/0210951 A1* | 7/2015 | Aizenberg | C10M 177/00 508/107 |
| 2015/0337161 A1* | 11/2015 | Haraguchi | C08L 83/04 428/335 |
| 2016/0021998 A1* | 1/2016 | Fathollahi | A45C 13/1076 224/191 |
| 2016/0178890 A1* | 6/2016 | Massard | G02B 26/005 345/214 |
| 2016/0260875 A1* | 9/2016 | Liang | H05B 33/22 |
| 2016/0366777 A1 | 12/2016 | Rogers et al. | |

FOREIGN PATENT DOCUMENTS

| | | |
|---|---|---|
| CN | 106459642 | 2/2017 |
| EP | 2500623 | 9/2012 |
| TW | 201500757 | 1/2015 |

OTHER PUBLICATIONS

Yau et al., "Investigation of nanocrystal-(Ti1-xA1x)Ny/amorphous-Si3N4 nanolaminate films," Surface and Coatings Technology, vol. 194, pp. 119-127, 2005.

Zhang et al., "Nanocomposite Thin Films for both Mechanical and Functional Applications," Advanced Materials for Micro- and Nano-Systems, 5 pages, 2004.

\* cited by examiner

COATINGS FOR ELECTRONIC DEVICES

CROSS-REFERENCE TO RELATED APPLICATION(S)

This application is a non-provisional patent application of and claims the benefit of U.S. Provisional Patent Application No. 62/736,646, filed Sep. 26, 2018 and titled "Coatings for Electronic Devices," the disclosure of which is hereby incorporated by reference in its entirety.

FIELD

The described embodiments relate generally to coatings for electronic devices. More particularly, the present embodiments relate to coatings including a linear fluorinated oligomer or linear fluorinated polymer.

BACKGROUND

External surfaces of electronic devices may be coated to provide resistance to fingerprints, smudges, and the like. For example, an oleophobic coating may be applied to a touch-sensitive input surface to improve its resistance to oils and other deposits that may affect appearance and performance. Such coatings may also make the device feel slippery or otherwise have a relatively low coefficient of friction.

SUMMARY

Embodiments described herein relate to coatings for electronic devices. Typically, the coatings described herein are applied to an external surface of the electronic device. The coatings may be patterned or plasma treated. The coatings may repel or be resistant to water, oil, or both due, in part, to inclusion of a fluorinated material in the coating. In embodiments, the fluorinated material includes a linear fluorinated oligomer or linear fluorinated polymer.

In some embodiments, the coating may be patterned to define regions or features of the fluorinated material. In aspects disclosed herein, the pattern defined by the coating is not visually discernable to the human eye, but imparts desired frictional properties. In embodiments, the patterned coating maintains good durability and resistance to water and/or oil.

In additional embodiments, the coating may be plasma treated to impart desired frictional properties. The plasma-treated coating may form a substantially continuous coating, rather than a patterned coating, over the external surface of the electronic device. The plasma-treated coating may also maintain good durability and resistance to water and/or oil. The plasma treatment may etch the coating, thereby reducing the thickness of the coating. Shortening the length of the molecules of the fluorinated material may increase the coefficient of friction of the coating. The plasma treatment may also modify the surface composition and/or the surface topography of the coating.

The disclosure also provides electronic devices comprising one or more coatings as described herein. As examples, the coating may be a patterned coating or an etched coating. The electronic device may comprise an enclosure that defines an outer surface and a patterned coating along the outer surface. The enclosure may further comprise an adhesion layer and the patterned coating may be bonded to the adhesion layer. The patterned coating may be located along one or more of a front surface, a back surface, or a side surface of the enclosure. For example, the linear fluorinated material is a linear fluorinated oligomer or polymer.

In some embodiments, the electronic device comprises a display and an enclosure at least partially surrounding the display and defining an outer surface. The electronic device further comprises an adhesion layer on the outer surface and a patterned coating bonded to the adhesion layer and defining one or more regions comprising a linear fluorinated material.

In additional embodiments, an electronic device comprises a display; an enclosure comprising a glass cover member, and a touch sensor at least partially within the enclosure and configured to detect touch inputs applied to a surface of the enclosure. The electronic device further comprises a patterned coating positioned along an outer surface of the glass cover member and defining micro-scale regions including a linear fluorinated oligomer and separated from one another by a micro-scale spacing.

The disclosure further provides cover glasses for electronic devices. In some embodiments, a cover glass comprises an outer surface, an adhesion layer on the outer surface; and a coating on the adhesion layer. The coating comprises one or more first regions comprising a linear fluorinated material and one or more second regions comprising a branched fluorinated material.

The disclosure additionally provides methods for making patterned coatings. In some embodiments, a coating is deposited through a mask to define features or regions of the coating. In additional embodiments, the coating is etched through a mask to define features or regions of the coating.

In some embodiments, a method of coating an electronic device with a coating comprises forming an adhesion layer along an external surface of a housing of an electronic device. In addition, the method comprises forming a patterned coating comprising a fluorinated material along the adhesion layer. The fluorinated material may be selected from the group consisting of a linear fluorinated oligomer, a linear fluorinated polymer, and combinations thereof.

BRIEF DESCRIPTION OF THE DRAWINGS

The disclosure will be readily understood by the following detailed description in conjunction with the accompanying drawings, wherein like reference numerals designate like elements.

Figure 1A:
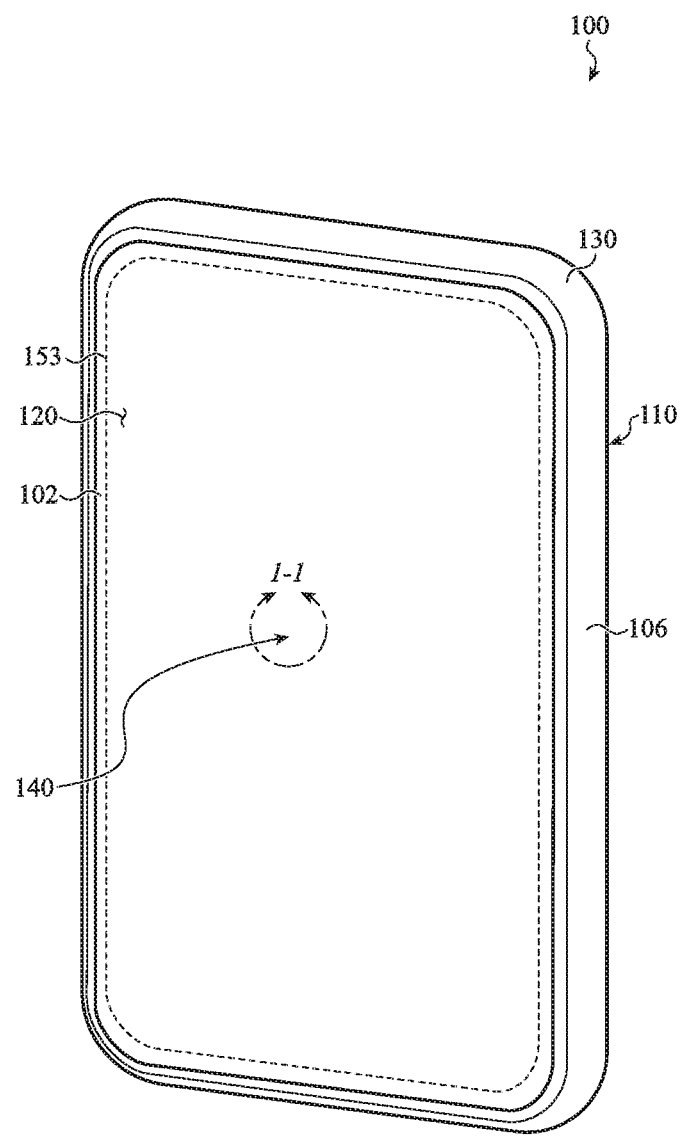
FIG. 1A shows a front view of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to coatings for electronic devices. Conventional coatings for electronic devices may improve the resistance of the device to oils and other deposits that may affect appearance and performance. Such coatings may also make the device feel slippery or have a relatively low coefficient of friction, which can increase the chances of the device falling off a support surface or slipping out of a user's hands.

Described herein are embodiments of coatings for electronic devices that provide a balance of properties including desirable frictional properties, durability, and repellency to water and/or oil. In embodiments, the coatings are patterned to define one or more regions of a fluorinated material. The one or more regions may be configured to provide desired frictional properties to the coating. For example, the one or more regions may be configured to make the coating less slippery. The coatings described herein may provide several advantages including, but not limited to, making the electronic device easier to hold and facilitating wireless charging functions.

In aspects disclosed herein, patterning of the coating defines apertures or gaps in the coating which are not visually discernable to the unaided eye, but impart desired frictional properties. For example, patterning of the coating may increase the coefficient of friction of the coating as compared to that of a comparable coating which is not patterned. In embodiments, the coating may have the appearance of being smooth or continuous even when it contains micro-scale (or smaller) apertures or gaps.

Patterning of the coating may define regions of a first fluorinated material and regions of a second fluorinated material. The differences between the two types of regions may not be visually discernable to the unaided eye. Inclusion of two different fluorinated materials in the coating, such as a linear and a branched fluorinated material, may impart desired frictional properties to the coating. The resulting coating may have a greater coefficient of friction as compared to a coating which includes only the linear fluorinated material.

Generally, the coating may define any of a number of patterns. As examples, the pattern may be regular or irregular. In additional examples, the pattern may be isotropic or anisotropic. In embodiments, the pattern may define a network, an array of regions or a combination thereof. Therefore, the coating may be continuous (such as when the pattern defines a network of interconnected regions) or discontinuous (such as when the pattern defines an array of separated regions). The pattern may be a micro-pattern, which may refer to patterns that include micro-scale regions. For example, micro-scale (and micro-sized) refers to regions having a dimension greater than or equal to 1 micrometer and less than 1 mm. In embodiments, the area fraction of the regions of the fluorinated material may be from 10% to 75%, 20% to 75%, or 25% to 70%. In embodiments where a linear and a branched fluorinated material are included in the coating, the area fraction of the linear fluorinated material may be from 10% to 75%, 20% to 75%, or 25% to 70% (with the remaining percentage being the branched fluorinated material).

In additional aspects, the coatings are plasma treated to provide desired frictional properties to the coating and make the coating less slippery. By the way of example, the coating may be exposed to an atmospheric-pressure plasma. The plasma treatment may etch the coating, thereby reducing the thickness of the coating. As the thickness of the coating decreases, the length and molecular weight of the fluorinated oligomer or polymer molecules also generally decreases. Shorter fluorinated oligomer or polymer molecules may be stiffer and thus provide a higher coefficient of friction. The plasma treatment may also modify the surface composition and/or the surface topography of the coating. In further embodiments, plasma treatment may cause crosslinking of the fluorinated oligomer or polymer molecules. Plasma treatment may be performed over the entire coating or a portion of the coating (e.g., a patterned portion).

In some embodiments described herein, the coating comprises a linear fluorinated material. As an example, the linear fluorinated material is a linear fluorinated oligomer or a linear fluorinated polymer. As an additional example, the coating may comprise linear fluorinated oligomer molecules, linear fluorinated polymer molecules, or a combination thereof. The coating may also comprise a linear fluorinated material and a branched fluorinated material. As an example, the branched fluorinated material is a branched fluorinated oligomer or polymer.

As previously discussed, the coatings described herein may be applied to an outer surface of an enclosure for an electronic device, including, but not limited to, a front surface, a back surface, and/or a side surface of the device. In embodiments, the outer surface of the enclosure may comprise glass. As examples, the surface may be provided by a front cover glass and/or a back cover glass, an enclosure component other than cover glass, or a single-piece glass enclosure. In further embodiments, the outer surface of the enclosure may comprise a ceramic or a glass ceramic.

These and other embodiments are discussed below with reference to FIGS. 1-17. However, those skilled in the art will readily appreciate that the detailed description given herein with respect to these figures is for explanatory purposes only and should not be construed as limiting.

FIG. 1A depicts a front view of a simplified example of an electronic device 100. In embodiments, the electronic device 100 may be a mobile telephone, a notebook computing device (e.g., a notebook), a tablet computing device (e.g., a tablet), a portable media player, a wearable device, or another type of portable device. The electronic device 100 may also be a desktop or notebook computer system, an input device, or virtually any other type of electronic product or device components.

As shown in FIG. 1A, the electronic device includes an enclosure 110. The enclosure 110 includes a cover member 120 and housing 130. The cover member 120 may be coupled to housing 130 using a faster or fastening technique. For example, the cover member 120 may be coupled to the housing 130 using an adhesive, an engagement feature, a fastener, or a combination thereof.

The electronic device 100 defines a front surface 102 and a side surface 106. As shown in FIG. 1A, the front surface 102 is defined, at least in part, by the cover member 120 and the side surface 106 is defined, at least in part, by the housing 130.

The cover member 120 may form part or all of the enclosure 110. In embodiments, the enclosure 110 may include both a front and a rear cover (e.g., one or both of which may be formed of or include glass), with each being separate enclosure components. In further embodiments, the cover member 120 may be a single monolithic component (e.g., a single piece of glass) which defines a back cover and a housing or a front cover, a back cover, and a housing. In some cases, the cover member 120 may define substantially the entire front surface of a device as well as a portion (or all) of a surrounding sidewall or side of the device. The cover member 120 may also define substantially the entire rear surface of the device as well as a portion (or all) of a surrounding sidewall or side of the device. Likewise, the cover member 120 may define front, rear, and sides of a device.

Typical cover members herein are thin, typically less than 5 mm in thickness, and more typically less than 3 mm in thickness. In some aspects, the cover member can be from about 0.1 mm to 2 mm in thickness, and more typically from 0.15 mm to 1 mm in thickness.

The cover member 120 may be formed of or include a glass, a glass ceramic, a plastic, or other suitable materials. In embodiments, a cover member, such as cover member 120 may comprise, consist essentially of, or consist of a glass member, such as a sheet of glass (e.g., a flat glass sheet or a contoured or shaped glass sheet). In some cases a cover member (e.g., cover member 120) may be formed from multiple layers that include one or more glass sheets, polymer sheets, glass ceramic sheets, ceramic sheets, and/or various coatings and layers. By way of example, coatings may be organic (e.g., an organic polymer), inorganic (e.g., a metal or a ceramic), or combinations thereof.

As previously discussed, a coating may be applied to an outer surface of the enclosure 110 so that the coating defines an exterior surface of the electronic device. Therefore, in embodiments the coatings described herein may be referred to as surface coatings. In embodiments, the coatings may be transparent to light in the visible spectrum. For the purposes of illustration, FIG. 1A shows coating 140 applied to an outer surface of cover member 120 and therefore defining front surface 102 of the electronic device. In embodiments, the coating is a patterned coating or is plasma treated, as disclosed herein. However, in additional embodiments, the coating may be applied to any outer surface of an enclosure, such as the front surface, a back surface, a side surface, or a combination of any of these surfaces. Examples of patterned coatings are shown in FIGS. 2A-6B.

Electronic device 100 may include one or more components at least partially enclosed by enclosure 110. In embodiments, electronic device 100 may include one or more of memory, a processor, control circuitry, a battery, an input device, an output device, a display, a sensor, or a charging component. Components of a sample electronic device are discussed in more detail below with respect to FIG. 17.

By the way of example, electronic device 100 may include a display 153. The cover member 120 may be provided as part of or over a display 153. The display 153 may produce high-resolution graphical output and the graphical output from the display 153 may be viewable through the cover member 120, in which case at least a portion of the cover member 120 may be transparent. In embodiments, the cover member may be transparent to light in the visible spectrum, translucent, opaque, or combinations of these. A more detailed description of the display 153 is included below with respect to FIG. 17.

Further, the electronic device 100 may include a touch sensor configured to detect a touch input at a surface of the enclosure. The touch sensor may be positioned below the cover member 120 and may comprise an array of capacitive electrodes. A touch sensor in combination with the display 153 may define a touchscreen or a touch-sensitive display.

Figure 1B:
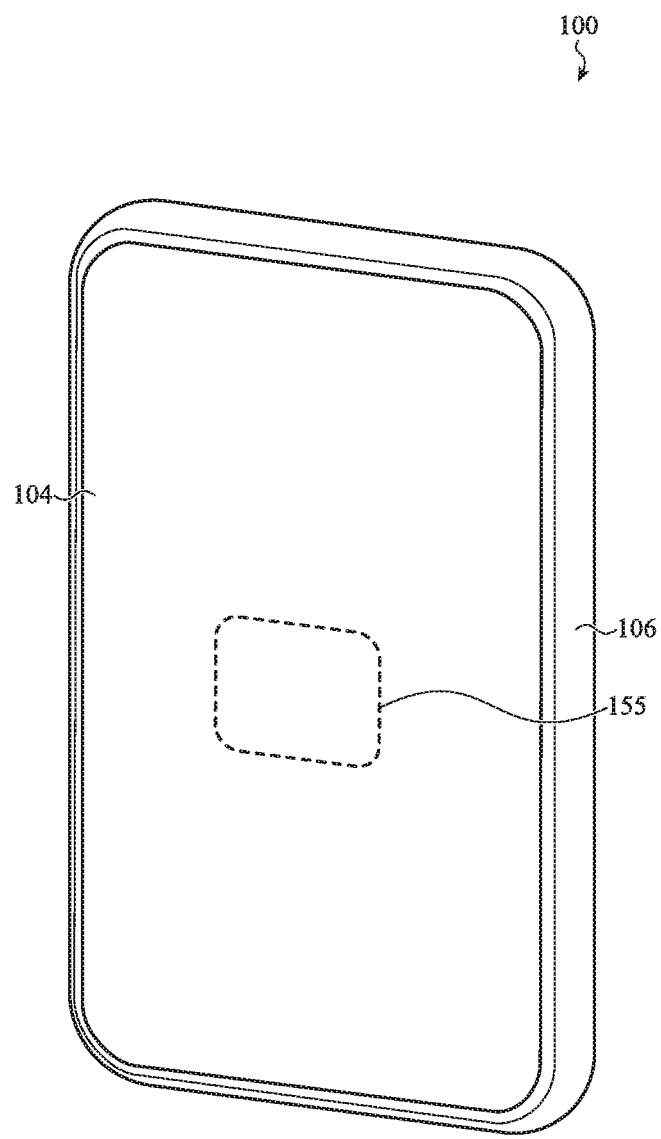
FIG. 1B shows a rear view of the electronic device of FIG. 1A.

Electronic device 100 may further include a charging component of a wireless charging system (e.g., wireless charging component 155 of FIG. 1B). The wireless charging system may include an induction coil and associated circuitry and/or other components, and may facilitate wireless transfer of power between the electronic device 100 and another device, such as a charger, a power source, another electronic device (e.g., a wearable electronic device), or the like. In some cases, the charging component (e.g., the wireless charging component 155) corresponds to an induction coil.

Coating 140 may facilitate and/or improve wireless charging of the electronic device 100 (or of a second electronic device). For example, electronic device 100 to which the coating 140 has been applied may be placed in contact with or in proximity to a wireless charging device (e.g., a charging station, charging pad, or the like), and the coating may help keep the electronic device 100 in contact with the wireless charging device. As an additional example, coating 140 may facilitate wireless charging of a second electronic device that is placed in contact with an external surface of the electronic device 100 (in which case the second electronic device may receive electrical power from and/or send electrical power to the electronic device 100). In this case, coating 140 may help prevent or reduce slippage between the electronic device 100 and the other device that is in contact with the coated surface, thereby helping to keep the wireless charging component 155 aligned with a corresponding component of the second electronic device.

FIG. 1B depicts a back view of the electronic device 100 of FIG. 1A. The housing 130 further comprises back surface 104. The back surface 104 and side surface 106 may each be defined by a metal, a glass, or a glass ceramic component. In further embodiments, the electronic device 100 may further include a second cover member 120 (which may define all or some of the back surface 104). For example, the electronic device may include both a front and a rear cover member. In embodiments, the rear cover member may also include a coating as described herein. FIG. 1B also schematically illustrates the location of internal wireless charging component 155. As described herein, the back surface 104 may be coated with coating 140 (or any other coating described herein) at least along the area corresponding to the wireless charging component 155. This positioning of coating 140 may reduce the likelihood of the electronic device 100 and another electronic device (e.g., a charging pad, a separate electronic device) slipping, sliding, or otherwise moving relative to one another while they are in contact with one another.

FIGS. 1A-1B illustrate an electronic device 100 having an enclosure 110 that can include cover members 120 (e.g., front and back cover members) and a housing 130. In some cases, the cover members 120 are formed of a transparent material such as glass, and the housing 130 is formed of a metal or other opaque material. In other examples, the back cover member (FIG. 1B) and the housing 130 may be a single monolithic component formed of a single component (e.g., metal, glass, polymer, etc.). In yet other examples, the back and front covers 120 and the housing 130 may be a single, monolithic component (e.g., a single piece of glass). Other configurations are also possible. Moreover, coatings described herein may be applied to any of the surfaces of the enclosure 110, regardless of the materials or construction of the enclosure components.

In embodiments, the various surfaces of cover member 120, housing 130, and enclosure 110 may be referenced with respect to their orientation in an electronic device. For example, cover member 120 may have a surface which faces an exterior of the electronic device. This surface may also form an outer surface of the cover member. The outer surface may include a front surface of glass article. Similarly, cover member 120 may have a surface which faces an interior of the electronic device. This surface may be referred to as an inner surface. The interior surface may include a back or rear surface of cover member 120. Some glass articles may also include at least one side surface between the interior surface and the outer surface. The orientation of the apparatus is not intended to be limited by the use of the terms "interior," "exterior," "front," "rear," "back," and "side" and so forth.

Figure 2A:
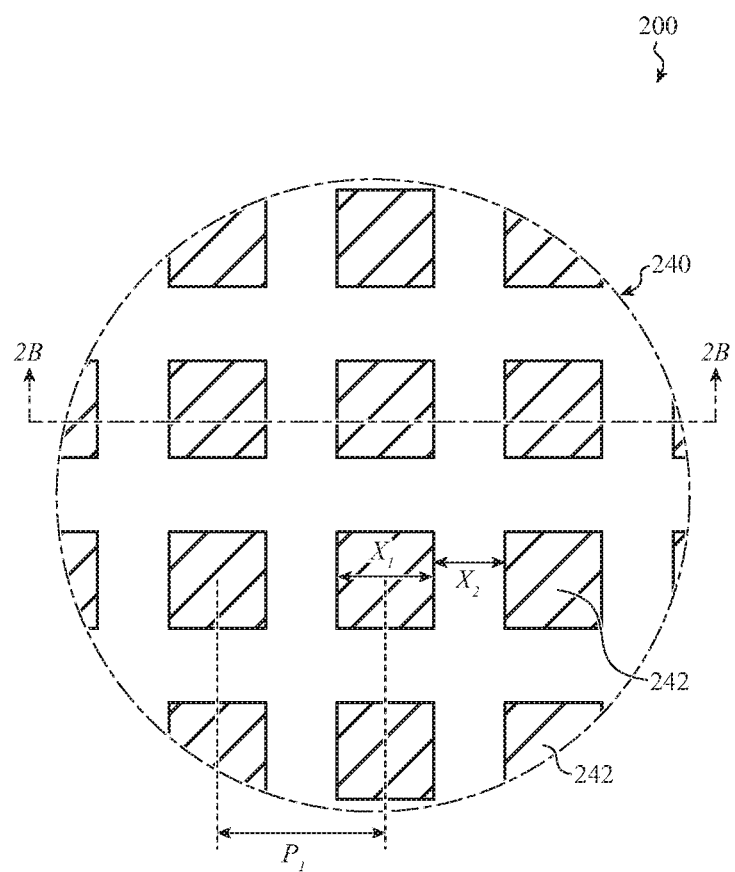
FIG. 2A shows an enlarged top view of an example patterned coating defining multiple discrete regions.

FIG. 2A shows an enlarged view of a patterned coating 240 along an outer surface of an enclosure of an electronic device 200. The patterned coating comprises regions 242 comprising a fluorinated material. Alternately, regions 242 may be referred to as features of the coating.

As previously discussed, the coating may define any of a number of patterns. In embodiments, patterned coatings as described herein may provide desirable frictional properties while also providing desirable levels of durability and repellency to water and/or oil. As shown in FIG. 2A, the regions 242 have a generally square shape and form an array with substantially uniform spacing between regions. The array of the regions 242 may define a grid pattern. However, the shape of the regions shown in FIG. 2A is not limiting, and the regions may have any of a number of shapes. As shown in FIG. 2A, regions 242 have a lateral dimension X1. In embodiments, a lateral dimension of a region may be micro-sized. As used herein, micro-sized (as well as micro-scale) may refer to a dimension greater than or equal to 1 micrometer and less than 1 mm. In embodiments, the lateral dimension of the regions is from 5 µm to 100 µm, from 10 µm to 75 µm, or from 20 µm to 50 µm. In some embodiments, the dimension that is micro-sized may be the longest dimension inside the shape (e.g., for a triangle or a rectangle).

Figure 2B:
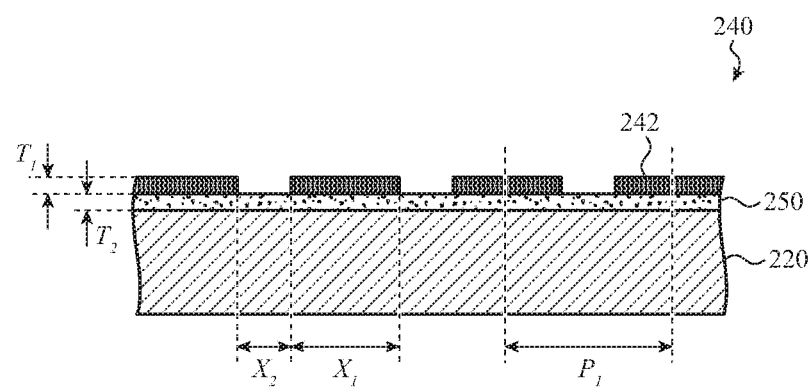
FIG. 2B shows an example of a partial cross-sectional view of the patterned coating of FIG. 2A.

A region 242 may be spaced apart from another region by a distance X2 (e.g., measured from an edge of one region to an edge of another region). In embodiments, a spacing between regions may be micro-sized, having a dimension greater than or equal to 1 micrometer and less than 1 mm. In embodiments, a lateral spacing between regions X2 is from 5 µm to 100 µm, from 10 µm to 75 µm, or from 20 µm to 50 µm. In further embodiments, a spacing between regions may be less than or equal to the lateral dimension of the regions. In additional embodiments, a pattern may be described in terms of the center to center distance between regions (also referred to as the pitch of the regions). As shown in FIG. 2B, the pitch P1 along a lateral direction is equal to the sum of X1 and X2, though other pitches are also contemplated. The pitch may also be micro-sized. In additional embodiments, an average spacing or pitch may be used to characterize the coating, such as when the spacing or pitch is randomized.

In embodiments, a pattern may also be described by the area fraction of the regions of a fluorinated material. For example, for a given area of the enclosure, the area fraction of the pattern of the fluorinated material is given by the area of the region(s) of the fluorinated material divided by the given area. The given area of the enclosure may correspond to the entire front surface of the enclosure, the entire front surface of the glass cover, or the like. In embodiments, the area fraction of the pattern is from about 10% to about 80%, from about 20% to about 75%, or about 25% to about 70%. When the patterned coating comprises a first linear fluorinated material and a second branched fluorinated material (as described with respect to FIGS. 6A-6B), the area fraction of the first linear fluorinated material may be about 10% to about 80%, from about 20% to about 75%, or about 25% to about 70%. In some embodiments, the sum of the area fractions of the first linear fluorinated material and the second branched fluorinated material is at least 90%, at least 95%, or approximately 100%.

FIG. 2B is an example cross-sectional view of the patterned coating 240 of FIG. 2A, viewed along line 2B-2B in FIG. 2A. As shown in FIG. 2B, regions 242 are defined by a linear fluorinated oligomer or a linear fluorinated polymer (e.g., an oleophobic coating) disposed on adhesion layer 250, which in turn is disposed on cover member 220. The adhesion layer 250 is exposed between regions 242. As previously described, the cover member (which may be an embodiment of the cover member 120) may be formed of or include a glass, a glass ceramic, a plastic, or other suitable materials. The cover member may also comprise a transparent region. Cover member 220 acts as a substrate for adhesion layer 250.

In embodiments, adhesion layer 250 is thin relative to regions 242. For example, thickness $T_1$ of regions 242 may be at least twice thickness $T_2$ of the adhesion layer 250. In embodiments, thickness $T_2$ of the adhesion layer is 10 nm or less, such as from 1 nm to 10 nm or from 1 nm to 5 nm. In embodiments, the thickness $T_1$ of the regions is from 5 to 20 nm or from 10 to 50 nm. In embodiments, adhesion layer 250 comprises a silicon oxide, comprises silicon dioxide, or consists essentially of silicon dioxide.

The fluorinated material within regions 242 is schematically indicated in FIG. 2B by wavy lines, though this may not represent the exact shape or configuration of the fluorinated material. In embodiments, the fluorinated material is selected from the group consisting of a linear fluorinated oligomer, a linear fluorinated polymer, and combinations thereof. By the way of example, the fluorinated may comprise a linear fluorinated oligomer. Examples of linear fluorinated oligomers and linear fluorinated polymers are discussed in greater detail below. As in FIG. 2A, X1 is the lateral dimension of regions 242, X2 is the spacing between regions 242, and P1 is the lateral pitch between regions 242. In embodiments, the pitch between regions may be micro-sized. Values for the lateral dimensions X1, X2 and P1 may be as previously described for FIG. 2A.

Figure 2C:
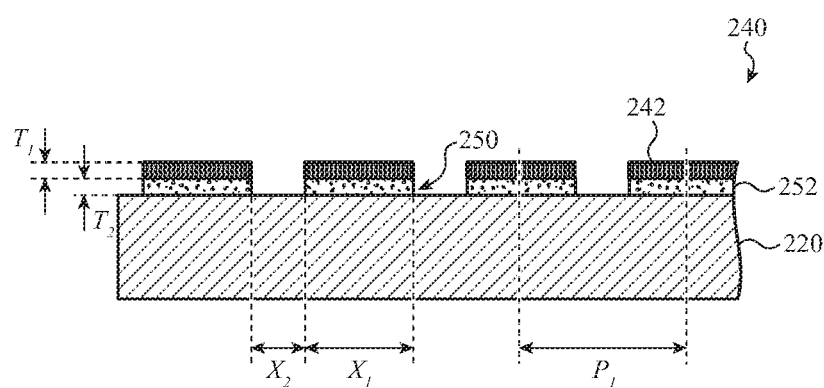
FIG. 2C shows another example of a partial cross-sectional view of the patterned coating of FIG. 2A.

FIG. 2C is another example of a cross-sectional view of the patterned coating 240 of FIG. 2A. In contrast to adhesion layer 250 of FIG. 2B, adhesion layer 250 of FIG. 2C is patterned and includes regions 252. As shown in FIG. 2C, regions 242 of the patterned coating 240 are disposed on regions 252 of adhesion layer 250. The regions 252 of adhesion layer 250 define a second pattern which is substantially the same as the first pattern defined by regions 242 of the coating. As in FIG. 2B, adhesion layer is disposed on cover member 220. Due to the patterning of adhesion layer 250, cover member 220 is exposed between regions 252.

As previously described, the cover member may be formed of or include a glass, a glass ceramic, a plastic, or other suitable materials and may also comprise a transparent region. In embodiments, adhesion layer 250 comprises an inorganic material. As examples, adhesion layer 250 may comprise a silicon oxide, such as silicon dioxide, or consist essentially of silicon dioxide.

In embodiments, adhesion layer 250 is thin relative to regions 242. For example, thickness $T_1$ of regions 242 may be at least twice the thickness $T_2$ of the adhesion layer 250. In embodiments, thickness $T_2$ of the adhesion layer is 10 nm or less, such as from 1 nm to 10 nm or from 1 nm to 5 nm. In embodiments, the thickness $T_1$ of the regions is from 5 to 20 nm or from 10 to 50 nm.

The fluorinated material within regions 242 is schematically indicated by wavy lines, though this may not represent the exact shape or configuration of the fluorinated material. In embodiments, the fluorinated material is selected from the group consisting of a linear fluorinated oligomer, a linear fluorinated polymer, and combinations thereof. By the way of example, the fluorinated may comprise a linear fluorinated oligomer. Examples of linear fluorinated oligomers and linear fluorinated polymers are discussed in greater detail below. As in FIG. 2A, X1 is the lateral dimension of regions 242, X2 is the spacing between regions 142, and P1 is the lateral pitch between regions 242. In embodiments, the pitch between regions may be micro-sized. Values for the lateral dimensions X1, X2 and P1 may be as previously described for FIG. 2A.

Figure 3:
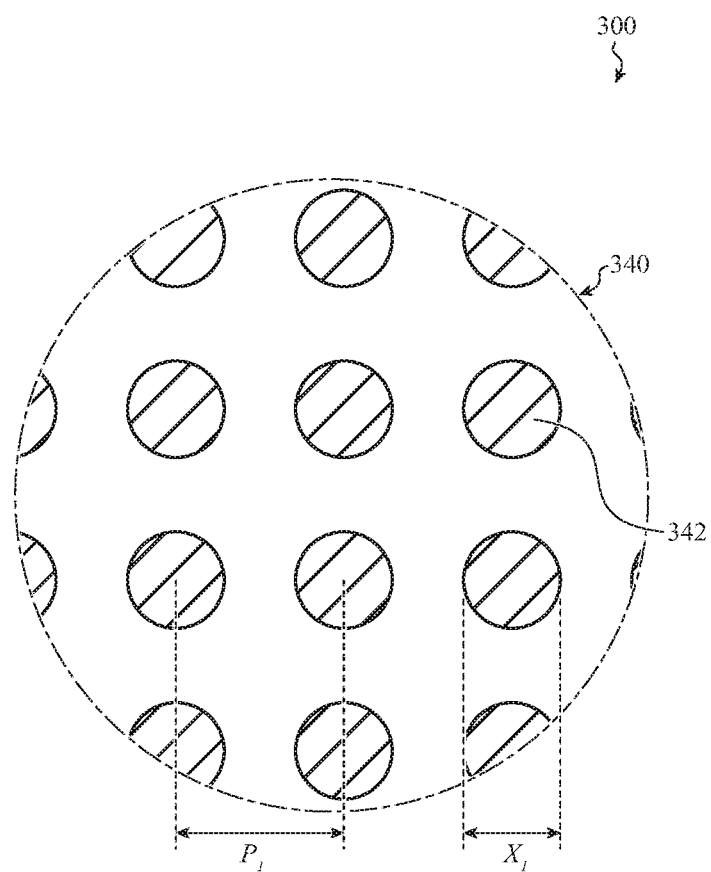
FIG. 3 shows an enlarged top view of an additional example patterned coating defining multiple discrete regions.

FIG. 3 shows an enlarged view of another example patterned coating 340 along an outer surface of an enclosure. Patterned coating 340 comprises regions 342 comprising a fluorinated material. As shown in FIG. 3, the regions 342 have a generally circular shape and form an array with substantially uniform spacing between regions. Alternately, regions 342 may be referred to as features of the coating.

As shown in FIG. 3, regions 342 have a lateral dimension X1, which in this case is a diameter of the generally circular region. In embodiments, the lateral dimension of regions 342 may be micro-sized, having a dimension greater than or equal to 1 micrometer and less than 1 mm. In embodiments, the lateral dimension of the regions is from 5 µm to 100 µm, from 10 µm to 75 µm, or from 20 µm to 50 µm. For the pattern of FIG. 3, the spacing between the regions varies due to the generally circular shape of the regions. In further embodiments, a minimum spacing between the regions may be less than or equal to the lateral dimension of the regions.

The pattern of FIG. 3 may be described in terms of the center to center distance between regions, or pitch P1. In embodiments where the regions 342 are generally circular, the pitch P1 may be equal to the lateral dimension X1 or may be greater than X1. In embodiments, the pitch between regions may be micro-sized, having a dimension greater than or equal to 1 micrometer and less than 1 mm.

In embodiments, the fluorinated material within regions 342 is selected from the group consisting of a linear fluorinated oligomer, a linear fluorinated polymer, and combinations thereof. By the way of example, the fluorinated material may comprise a linear fluorinated oligomer. Examples of linear fluorinated oligomers and linear fluorinated polymers are discussed in greater detail below.

Figure 4A:
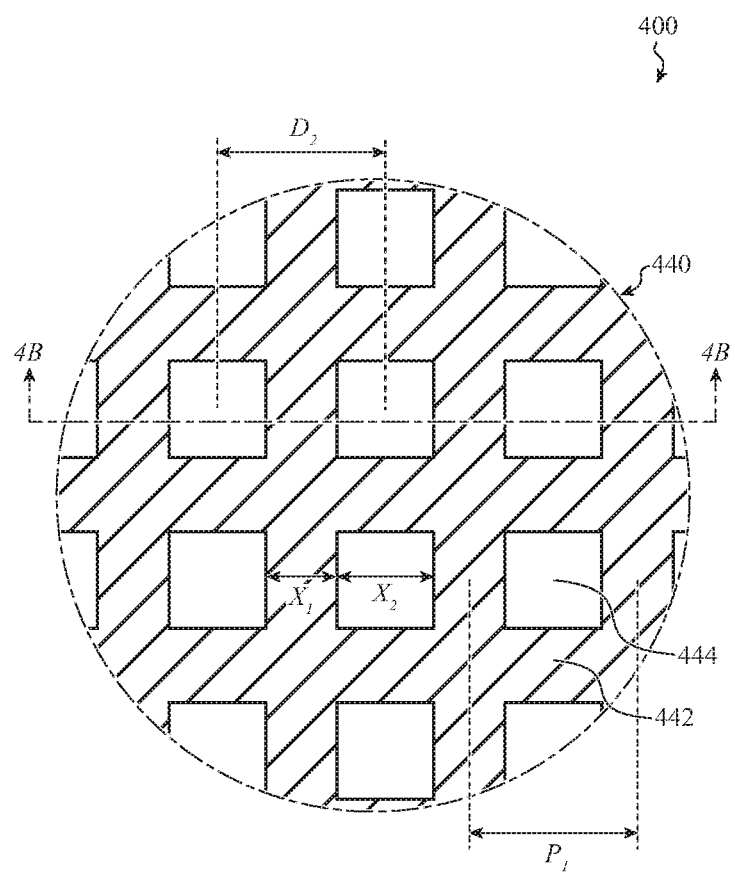
FIG. 4A shows an enlarged top view of an example patterned coating defining a network.

FIG. 4A shows an enlarged view of another example patterned coating 440 along an outer surface of an enclosure of an electronic device 400. The patterned coating defines regions 442 comprising a fluorinated material. As shown in FIG. 4A, the regions 442 are connected to form a network and the network defines apertures 444. As shown in FIG. 4A, the network has the form of a grid and apertures 444 have a generally square shape. However, the network and aperture shapes shown are not limiting and the network and the apertures may have any number of shapes (e.g., the apertures 444 may be circular, rectangular, triangular, or any other suitable shape).

As shown in FIG. 4A, the regions 442 of the network have a lateral dimension X1. In embodiments, the lateral dimension of regions 442 may be micro-sized or micro-scale, having a dimension greater than or equal to 1 micrometer and less than 1 mm. In embodiments, the lateral dimension of the regions is from 5 µm to 100 µm, from 10 µm to 75 µm, or from 20 µm to 50 µm.

Apertures 444 may have a lateral dimension X2. In embodiments, the lateral dimension of the apertures may be micro-sized or micro-scale, having a dimension greater than or equal to 1 micrometer and less than 1 mm. In embodiments, the lateral dimension X2 is from 5 µm to 100 µm, from 10 µm to 75 µm, or from 20 µm to 50 µm. In additional embodiments, the network may be described in terms of the center to center distance between regions, or pitch. As shown in FIG. 4A, the pitch P1 along a lateral direction is equal to the sum of X1 and X2. The pitch may also be micro-sized.

Figure 4B:
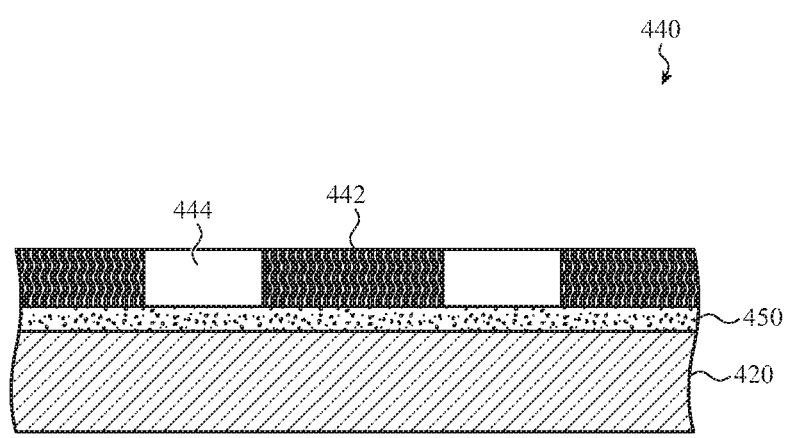
FIG. 4B shows an example of a partial cross-sectional view of the patterned coating of FIG. 4A.

FIG. 4B is an example cross-sectional view of the patterned coating 440 of FIG. 42A, viewed along line 4B-4B in FIG. 4A. As shown in FIG. 4B, regions 442 are defined by a linear fluorinated oligomer or a linear fluorinated polymer (e.g., an oleophobic coating) disposed on adhesion layer 450, which in turn is disposed on cover member 420. As previously shown in FIG. 4A, the regions 442 are connected to form a network and the network defines apertures 444. As previously described, the cover member (which may be an embodiment of the cover member 120) may be formed of or include a glass, a glass ceramic, a plastic, or other suitable materials. The cover member may also comprise a transparent region. Cover member 420 acts as a substrate for adhesion layer 450.

In embodiments, adhesion layer 450 is thin relative to regions 442. The thicknesses of the regions 442 and the adhesion layer 450 may be similar to those described for the coating of FIGS. 2A-2C. In embodiments, adhesion layer 450 comprises a silicon oxide, comprises silicon dioxide, or consists essentially of silicon dioxide.

The fluorinated material within regions 442 is schematically indicated in FIG. 4B by wavy lines, though this may not represent the exact shape or configuration of the fluorinated material. In embodiments, the fluorinated material is selected from the group consisting of a linear fluorinated oligomer, a linear fluorinated polymer, and combinations thereof. By the way of example, the fluorinated may comprise a linear fluorinated oligomer. Examples of linear fluorinated oligomers and linear fluorinated polymers are discussed in greater detail below. The dimensions of regions 442 and apertures 444 may be as described for FIG. 4A.

As shown in FIG. 4B, apertures 444 are regions where substantially no fluorinated material is present. Therefore, adhesion layer 450 is exposed at the location of apertures 444. In embodiments were the adhesion layer is omitted, the cover member 420 may be exposed at the location of apertures 444.

In embodiments, the fluorinated material within regions 442 is selected from the group consisting of a linear fluorinated oligomer, a linear fluorinated polymer, and combinations thereof. By the way of example, the fluorinated material may comprise a linear fluorinated oligomer. Examples of linear fluorinated oligomers and linear fluorinated polymers are discussed in greater detail below.

Figure 5:
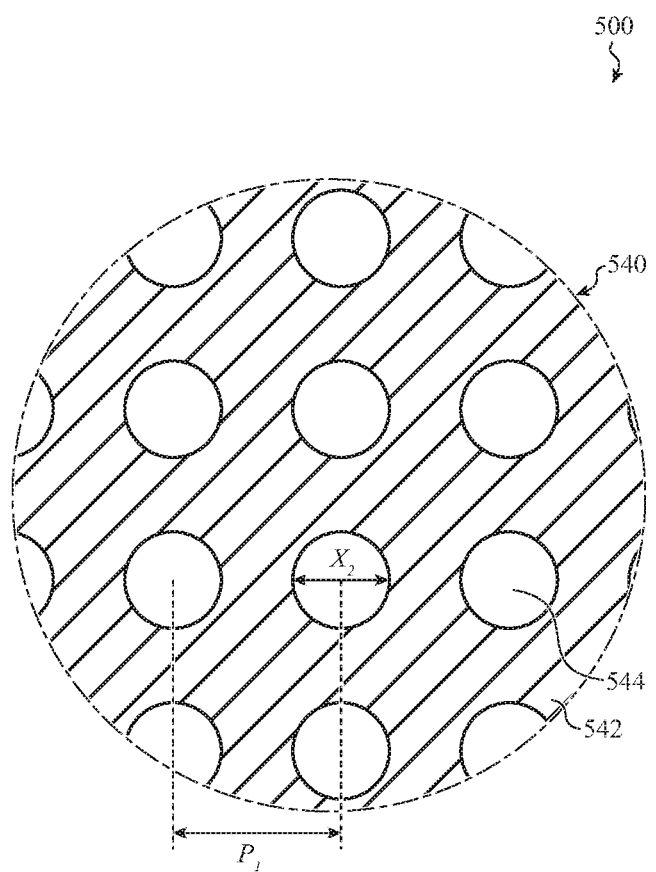
FIG. 5 shows an enlarged top view of an additional example patterned coating defining a network.

FIG. 5 shows an enlarged view of another example patterned coating 540 along an outer surface of an enclosure of an electronic device 500. The patterned coating defines regions 542 comprising a fluorinated material. As shown in FIG. 5, the regions 542 are connected to form a network and the network defines apertures 544. As shown in FIG. 5, the apertures 544 have a generally square shape.

As shown in FIG. 5, the lateral dimensions of the network regions 542 vary due to the shape of the apertures 544. In embodiments, the lateral dimension of regions 542 may be micro-sized, having a dimension greater than or equal to 1 micrometer and less than 1 mm. In embodiments, the lateral dimension of the regions is from 5 µm to 100 µm, from 10 µm to 75 µm, or from 20 µm to 50 µm.

Apertures 544 may have a lateral dimension X2, which in this case is a diameter. In embodiments, the lateral dimension of the apertures may be micro-sized, having a dimension greater than or equal to 1 micrometer and less than 1 mm. In embodiments, the lateral dimension X2 is from 5 µm to 100 µm, from 10 µm to 75 µm, or from 20 µm to 50 µm. In additional embodiments, a pattern may be described in terms of the center to center distance between regions, or pitch. As shown in FIG. 5, the pitch P1 along a lateral direction is equal to the sum of X1 and X2. The pitch may also be micro-sized.

In embodiments, the fluorinated material within regions 542 is selected from the group consisting of a linear fluorinated oligomer, a linear fluorinated polymer, and combinations thereof. By the way of example, the fluorinated material may comprise a linear fluorinated oligomer. Examples of linear fluorinated oligomers and linear fluorinated polymers are discussed in greater detail below.

Figure 6A:
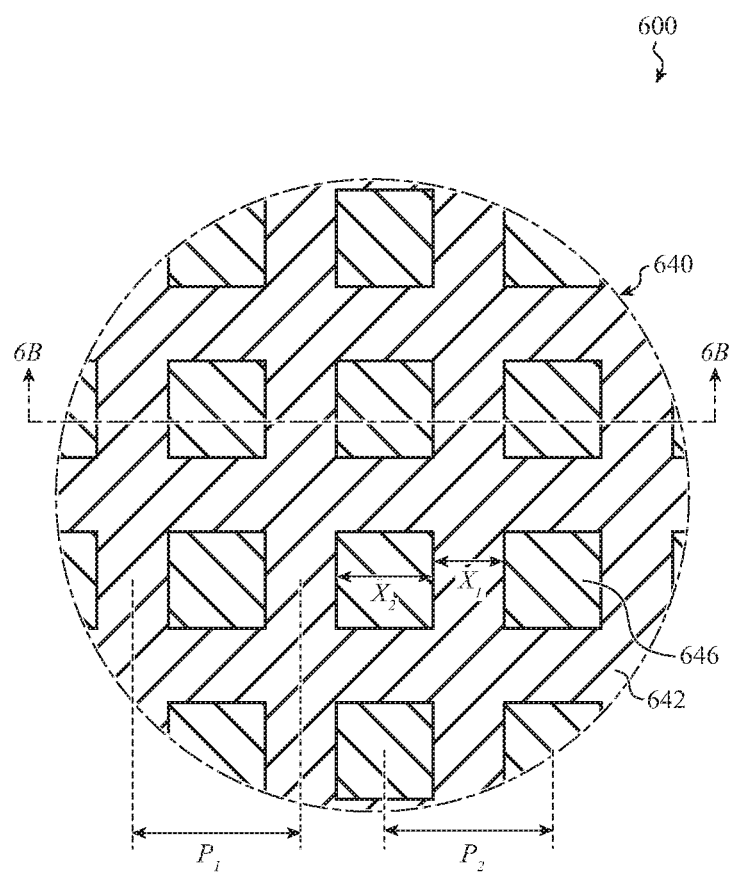
FIG. 6A shows an enlarged top view of an example patterned coating defining first and second regions including different materials.

FIG. 6A shows an enlarged view of another example patterned coating 640 along an outer surface of an enclosure of an electronic device 600. The patterned coating defines regions 642 comprising a first fluorinated material and regions 646 comprising a second fluorinated material. As shown in FIG. 6A, the regions 642 are connected to form a network which has the form of a grid. The regions 646 have a generally square shape and are positioned within apertures of the network.

As shown in FIG. 6A, the regions 642 of the network have a lateral dimension X1. In embodiments, the lateral dimension of regions 642 may be micro-sized, having a dimension greater than or equal to 1 micrometer and less than 1 mm. In embodiments, the lateral dimension of the regions is from 5 µm to 100 µm, from 10 µm to 75 µm, or from 20 µm to 50 µm.

Regions 646 may have a lateral dimension X2. In embodiments, the lateral dimension of the regions 646 may be micro-sized, having a dimension greater than or equal to 1 micrometer and less than 1 mm. In embodiments, the lateral dimension X2 is from 5 µm to 100 µm, from 10 µm to 75 µm, or from 20 µm to 50 µm. In additional embodiments, a pattern may be described in terms of the center to center distance between regions, or pitch. As shown in FIG. 6A, each of the pitch P1 between regions 642 and the pitch P2 between regions 646 is equal to the sum of X1 and X2. The pitch P1 and P2 may also be micro-sized.

In embodiments, the fluorinated material within regions 642 is selected from the group consisting of a linear fluorinated oligomer, a linear fluorinated polymer, and combinations thereof. By the way of example, the fluorinated material may comprise a linear fluorinated oligomer. In embodiments, the fluorinated material within regions 648 is selected from the group consisting of a branched fluorinated oligomer, a branched fluorinated polymer, and combinations thereof. By the way of example, the fluorinated material may comprise a branched fluorinated oligomer. Examples of linear fluorinated oligomers, linear fluorinated polymers, branched fluorinated oligomers, and branched fluorinated polymers are discussed in greater detail below.

Figure 6B:
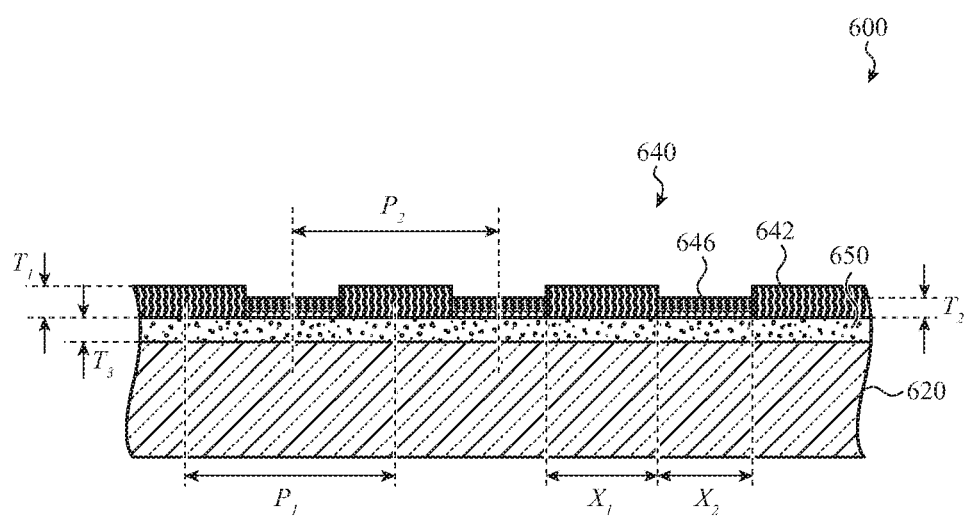
FIG. 6B shows an example of a partial cross-sectional view of the patterned coating of FIG. 6A.

FIG. 6B is an example cross-sectional view of the patterned coating 640 of FIG. 6A, viewed along line 6B-6B in FIG. 6A. As shown in FIG. 6B, regions 642 and 646 of the coating are disposed on adhesion layer 650, which in turn is disposed on cover member 620 (which may be an embodiment of the cover member 120). As previously described, the cover member may be formed of or include a glass, a glass ceramic, a plastic, or other suitable materials. The cover member may also comprise a transparent region.

As shown in FIG. 6B, the regions 642 of the network have a lateral dimension X1. In embodiments, the lateral dimension of regions 642 may be micro-sized, having a dimension greater than or equal to 1 micrometer and less than 1 mm. Regions 646 may have a lateral dimension X2. In additional embodiments, a pattern may be described in terms of the center to center distance between regions, or pitch. As shown in FIG. 6B, the pitch P1 along a lateral direction is equal to the sum of X1 and X2. One or more of lateral dimensions X1 and X2 and pitch P1 may be micro-sized.

Values for the lateral dimensions X1, X2 and P1 may be as previously described for FIG. 6A.

In embodiments, adhesion layer 650 is thin relative to regions 642. For example, thickness $T_1$ of the regions 642 may be at least twice thickness $T_3$ of the adhesion layer. In embodiments, thickness $T_3$ of the adhesion layer is 10 nm or less, such as from 1 nm to 10 nm or from 1 nm to 5 nm. In embodiments, the thickness $T_1$ of the regions 642 is from 5 nm to 20 nm or from 10 nm to 50 nm. In some embodiments, the thickness $T_2$ of the regions 646 is substantially the same as the thickness $T_1$ of regions 642. In additional embodiments, the thickness $T_2$ of the regions 646 is less than thickness $T_1$ of regions 642 and greater than that of adhesion layer 650. In embodiments, adhesion layer 650 comprises a silicon oxide, comprises silicon dioxide, or consists essentially of silicon dioxide.

In embodiments, the fluorinated material within regions 642 is selected from the group consisting of a linear fluorinated oligomer, a linear fluorinated polymer, and combinations thereof. By the way of example, the fluorinated material may comprise a linear fluorinated oligomer. In embodiments, the fluorinated material within regions 648 is selected from the group consisting of a branched fluorinated oligomer, a branched fluorinated polymer, and combinations thereof. By the way of example, the fluorinated material may comprise a branched fluorinated oligomer. Examples of linear fluorinated oligomers, linear fluorinated polymers, branched fluorinated oligomers, and branched fluorinated polymers are discussed in greater detail below.

The present disclosure relates to coatings that may be described as hydrophobic, oleophobic, or both. In some embodiments, the contact angle of water, oil, or another liquid may be used to assess whether the coating is hydrophobic, oleophobic, or both. In addition, the surface energy of the coating may be used to predict whether the coating will repel water or oil.

In embodiments the description of the coating as hydrophobic or oleophobic may be based on the contact angle or an apparent contact angle of a droplet of water oil, oil, or another liquid on the patterned coating. When the liquid droplet is larger than the regions of the pattern, an apparent contact angle will typically be measured. The apparent contact angle may be different than the contact angle measured on a continuous surface. Typically the contact angle or apparent contact angle is measured as a static contact angle. However in some cases dynamic contact angles may be measured.

In embodiments, a coating may be described as hydrophobic if the contact angle or apparent contact angle of water is greater than or equal about 90 degrees, greater than or equal to about 100 degrees, greater than or equal to about 110 degrees, or from 90 degrees to about 120 degrees.

In embodiments, a coating may be described as oleophobic if the contact angle or the apparent contact angle of an oil or a similar liquid is greater than or equal to about 65 degrees, greater than or equal about 70 degrees, greater than or equal to about 80 degrees, or greater than or equal to about 90 degrees. For example, the contact angle or apparent contact angle of ethylene glycol or hexadecane on the coating may be used to assess oleophobicity. For example, the contact angle or apparent contact angle used to assess oleophobicity may be a static contact angle.

In some embodiments, the contact angle of water, oil, or another liquid may be measured after the coating has undergone abrasion testing. For example, the contact angle may be measured after a specified number of cycles of abrasion testing. A variety of test equipment is available to simulate abrasion under use conditions; including rotary and linear Taber® and Abrex® testing machines.

The coatings of the present disclosure may also be characterized by their frictional properties. In embodiments, the patterned coatings described herein may exert a greater frictional force on an object than a comparable coating material which has not been patterned. For example, the patterned coatings described herein may exert a greater frictional force on a support surface such as a table or desk or on a source of input such as a stylus or the finger of a user. A comparable coating may be a coating of the linear fluorinated material which is not patterned. In further embodiments, the frictional properties of the coating may be measured by coefficient of friction of the coating. For example, the coefficient of friction may be a static coefficient of friction or a dynamic coefficient of friction. In embodiments, the coefficient of friction of the patterned coatings described herein is significantly less than the corresponding coefficient of friction for a coating of the same material which is not patterned. For example, the coefficient of friction of the patterned coating may be less than or equal to 90%, 80%, 70%, 60%, or 50% of the corresponding coefficient of friction.

The present disclosure describes patterned coatings including regions or features of comprising a fluorinated material. In some embodiments, the regions or features comprise a linear fluorinated material. In additional embodiments, additional regions or features of the coating comprise a branched fluorinated material. For example, a network may comprise the linear fluorinated material and the apertures in the network may be occupied by regions of the branched fluorinated material. The following discussion of linear and branched fluorinated materials is general to the coatings described herein and relates at least to FIGS. 1A through 15B.

In embodiments, the fluorinated material includes a fluorinated oligomer, a fluorinated polymer, or a combination thereof. An oligomer typically comprises multiple oligomer molecules while a polymer typically comprises multiple polymer molecules. Oligomer and polymer molecules typically comprise a chain of monomeric repeat units. As an example, an oligomer molecule may include at least 10 and up to 100 monomeric repeat units. A polymer molecule may include a greater number of monomeric repeat units than an oligomer, such as greater than 100 monomeric repeat units.

A given oligomer or polymer molecule has a molecular weight. Oligomers and polymers, which include multiple oligomer or polymer molecules, are typically described by a molecular weight distribution. In some embodiments, classification of fluorinated material as an oligomer or a polymer may be based on the weight average molecular weight of the material. As an example, a fluorinated material may have a molecular weight from 500 to 10,000, 750 to 8000, or 1000 to 6000, based on weight average molecular weight. In embodiments, such a fluorinated material may be considered an oligomer.

A fluorinated oligomer or polymer molecule contains one or more fluorine atoms in its structure. Typically a fully fluorinated (or perfluorinated) oligomer or polymer may include C-C bonds, C-F bonds and/or C-O bonds, but not C-H bonds or C-X bonds, where C is a halogen other than fluorine (in some embodiments, this classification may exclude the bonding within functional and linking groups attached to the chain). A partially fluorinated oligomer or polymer chain may include other types of bonds, such as C-H bonds and/or C-X bonds. Fully fluorinated oligomers or polymer molecules may include polytetrafluoroethylene (PTFE) or perfluropolyether (PFPE) monomeric repeating units (also referred to herein as repeat units). In embodiments, the fluorinated material comprises fully fluorinated oligomer molecules, fully fluorinated polymer molecules, or a combination thereof. The fluorinated oligomer molecules, the linear fluorinated polymer molecules, or combination thereof may comprise perfluoropolyether repeat units.

In embodiments, a fluorinated oligomer or polymer molecule may include a functional end group which attaches the fluorinated oligomer or polymer to the enclosure. As an example, the end group may directly attach the fluorinated oligomer or polymer molecule to the enclosure. As an additional example, the end group may attach the fluorinated oligomer or polymer molecule to an adhesion layer on the enclosure. The end group may comprise a linker moiety and at least one functional group that facilitate the attachment of the fluorinated oligomer or polymer molecules to the enclosure. By the way of example, the functional group may include a silane group or a hydroxyl group capable of interacting with surface groups of the enclosure of the adhesion layer. In embodiments, the fluorinated oligomer or polymer molecule may form a bond with the enclosure or the adhesion layer, such as a primary or a secondary bond. For example, the fluorinated oligomer or polymer molecule may form at least one of a covalent bond and a hydrogen bond with the enclosure or the adhesion layer.

Figure 7A:
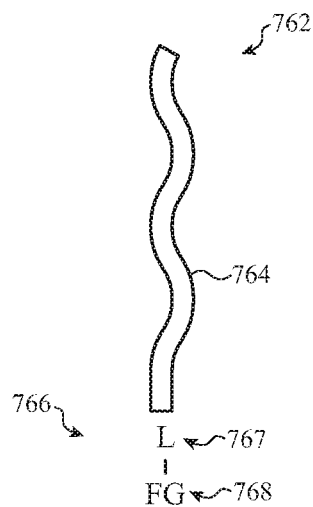
FIGS. 7A and 7B schematically show examples of linear fluorinated molecules.
Figure 7B:
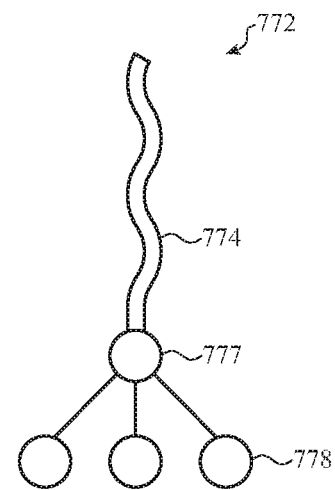

As used herein, a linear fluorinated material may refer to a linear fluorinated oligomer, a linear fluorinated polymer, or a combination thereof. FIGS. 7A and 7B each schematically illustrate an exemplary linear fluorinated molecule including a chain of multiple monomeric repeat units and functional groups attached to the chain. In FIG. 7A, the linear fluorinated molecule 762 includes linear fluorinated chain 764 of monomeric repeat units bonded to an end group 766. End group 766 includes linking moiety (L) 777, which in turn is bonded to at least one functional group (FG) 768. As shown, the linear fluorinated chain does not include branches and need not form a straight line. Further details of the linear fluorinated chain, including the fluorine atoms, are not shown. As previously discussed, the at least one functional group may facilitate attachment of the fluorinated oligomer or polymer molecules to the enclosure. By the way of example, the functional group may include a silane group or a hydroxyl group capable of interacting with surface groups of the enclosure or of the adhesion layer. In embodiments, the fluorinated oligomer or polymer molecule may form a bond, such as a primary or a secondary bond, with the enclosure or the adhesion layer. For example, the fluorinated oligomer or polymer molecule may form at least one of a covalent bond and a hydrogen bond with the enclosure or the adhesion layer.

FIG. 7B schematically illustrates an example linear fluorinated molecule 772 including linear fluorinated chain 774 of monomeric repeat units bonded to three functional groups 778 through linking moiety 777. The number of functional groups shown is not intended to be limiting. Further, each functional group in itself may be multifunctional, such as a silane functional group including silicon bonded to multiple hydrolyzable groups (e.g., alkoxy, acyloxy, amine). Details of the linear fluorinated oligomer chain are not shown. Examples of functional groups include, but are not limited to, silane groups and hydroxyl groups.

Figure 8A:
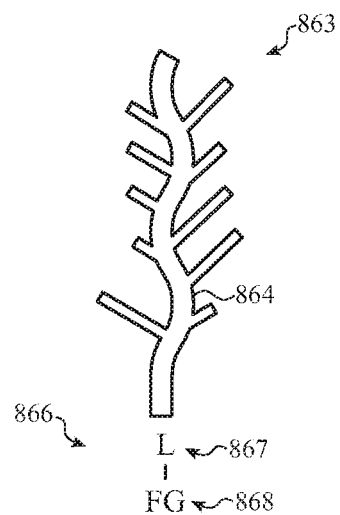
FIGS. 8A and 8B schematically show examples of branched fluorinated molecules.
Figure 8B:
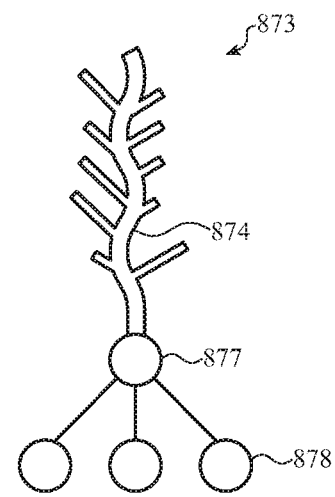

As used herein, a branched fluorinated material may refer to a branched fluorinated oligomer, a branched fluorinated polymer, or a combination thereof. FIGS. 8A and 8B each schematically illustrate a branched fluorinated molecule including a branched chain of multiple monomeric repeat units and functional groups attached to the chain. For the branched fluorinated molecule 863 of FIG. 8A, the branched fluorinated chain 864 is bonded to an end group 866. The branches of oligomer chain may include one or more monomeric repeat units. Details of the branched fluorinated chains are not shown. End group 866 includes linking moiety (L), 867, which in turn is bonded to at least one functional group (FG), 868. As previously discussed, the at least one functional group may facilitate the attachment of the fluorinated oligomer or polymer molecule to the enclosure or the adhesion layer. The functional groups of branched fluorinated oligomer and polymer molecules may be similar to those discussed with respect to FIGS. 7A and 7B.

For the branched fluorinated molecule 873 of FIG. 8B, a branched fluorinated chain 874 bonded to linking moiety 877. Linking moiety 877 is bonded in turn to three functional groups 878. Details of the branched fluorinated chains are not shown and the number of functional groups shown is not intended to be limiting.

In additional embodiments, the fluorinated material may include a mixture of linear and branched molecules. In some embodiments, the fluorinated material may predominantly include linear fluorinated oligomer or linear fluorinated polymer molecules, but may contain small amounts of branched fluorinated oligomer or branched fluorinated polymer molecules. For example, a fluorinated material may include less than 20% or less than 10% by weight of branched fluorinated oligomer or polymer molecules. In addition, the fluorinated material may consist essentially of the linear fluorinated oligomer or linear fluorinated polymer molecules, and, for example, may include less than 5% by weight of branched fluorinated oligomer or polymer molecules. As another example, a fluorinated material may include less than 20% or less than 10% by weight of a linear fluorinated oligomer or linear fluorinated polymer molecules. In addition, the fluorinated material may consist essentially of the branched fluorinated oligomer or branched fluorinated polymer molecules, and, for example, may include less than 5% by weight of linear fluorinated oligomer or linear fluorinated polymer molecules.

Figure 9:
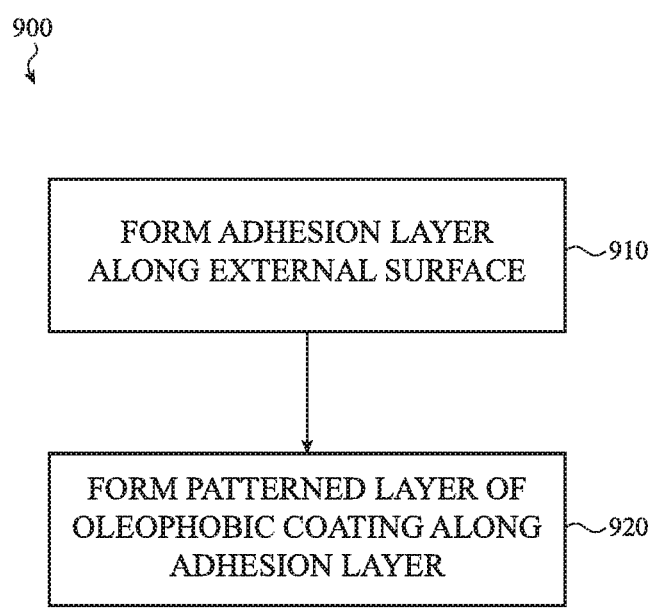
FIG. 9 shows a flowchart of an example process for making a patterned coating.

In additional aspects, the disclosure provides methods for making patterned coatings. FIG. 9 schematically illustrates process 900 for making a patterned coating. Process 900 may be used for making the patterned coatings of FIGS. 2A, 2B, 2C, 3-5, 6A, and 6B.

Operation 910 may comprise forming an adhesion layer along an external surface of an enclosure of an electronic device. In embodiments, the adhesion layer comprises an inorganic material. As examples, the adhesion layer may comprise a silicon oxide, such as silicon dioxide, or consist essentially of silicon dioxide. In embodiments, thickness of the adhesion layer is 10 nm or less, such as from 1 nm to 10 nm or from 1 nm to 5 nm.

In embodiments, the adhesion layer is formed using a vapor deposition technique, such as a physical vapor deposition (PVD) technique or a chemical vapor (CVD) deposition technique. Suitable physical vapor deposition techniques include, but are not limited to, sputtering, electron beam PVD, and pulsed laser deposition. The physical vapor deposition technique may take place under reduced pressure (e.g., under a vacuum). The vacuum deposition technique may rely on one or more source materials. For example, the source material may comprise a silicon oxide (e.g., silicon dioxide) or may comprise separate sources of silicon and oxygen.

In embodiments, a mask is applied to the external surface of the housing prior to deposition of the adhesion layer, so that deposition of the adhesion layer occurs through apertures in the mask. In embodiments, the mask may be referred to as a stencil mask. The resulting adhesion layer is patterned, with the pattern of the adhesion layer being determined by the pattern of the apertures of the mask. The mask may include any of a variety of aperture patterns. For example, the mask may be a mesh having a mesh size from about 1,250 (opening size about 10 microns) to about 200 (opening size about 74 microns). The mask is typically compatible with the physical vapor deposition process. In embodiments, the mask is formed of or includes a metal, of silicon, of silicon nitride ($SiN_x$), or of a polymer. In further embodiments, the adhesion layer is deposited with a substantially uniform thickness. In embodiments, thickness of the adhesion layer is 10 nm or less, such as from 1 nm to 10 nm or from 1 nm to 5 nm.

Operation 920 may comprise forming a patterned layer of a coating on the adhesion layer. The patterned layer may be a micro-patterned layer defining at least one micro-scale region or feature. The coating may comprise a fluorinated material as discussed above. For example, the fluorinated material may be selected from the group consisting of a linear fluorinated oligomer, a linear fluorinated polymer, and combinations thereof.

In embodiments, the operation of forming a patterned layer of the coating includes deposition of the fluorinated material through apertures of a mask. The fluorinated material may be deposited through vapor deposition. For example, the fluorinated material may be deposited through a physical vapor deposition process such as a liquid vaporization process. The direct liquid vaporization process may include vaporization of a liquid material including the fluorinated material and then depositing the fluorinated material on the adhesion layer. As an additional example, deposition of the coating may occur through a chemical vapor deposition (CVD) process, such as a plasma enhanced chemical vapor deposition process. The CVD process may use a fluorinated precursor material. In addition, wet chemistry techniques employing an adherent mask may be used to deposit the fluorinated material.

In embodiments where the coating is patterned through deposition of a fluorinated material through a mask, the aperture pattern of the mask aligns with the desired pattern of the regions or features of the coating. Regions or features of the coating are therefore formed at the location of apertures in the mask. For example, the mask may be a mesh having a mesh size from about 1,250 (opening about 10 microns) to about 200 (opening size about 74 microns). The mask is typically compatible with the physical vapor deposition process. In embodiments, the mask is formed of or includes a metal, of silicon, of silicon nitride, or a polymer.

In additional embodiments, the adhesion layer and the fluorinated material are deposited as substantially continuous layers to form a continuous coating (e.g., defining no apertures), and the coating is then patterned via etching through a mask. Suitable etching techniques include, but are not limited to, ion beam techniques or plasma techniques. In embodiments, the etching technique removes the coating but does not substantially remove the adhesion layer.

In embodiments where the coating is patterned by etching a continuous coating using a mask, the aperture pattern of the mask aligns with or defines the desired pattern of apertures of the coating. Apertures in the coating are therefore formed at the position of apertures in the mask. In embodiments, the mask may be a hard mask which is resistant to etching. For example, the mask may be formed of or include a metal, of silicon, of silicon nitride, or of a polymer with an etch resistant layer on the backside (the side facing away from the enclosure to be coated).

In embodiments, the coating is treated to increase the bonding between the coating and adhesion layer (or the external surface of the housing if the adhesion layer is omitted). As an example, the coating is treated to increase the number of bonds between the fluorinated material and the adhesion layer or the external surface of the housing. The bonds may be primary bonds (e.g., covalent bonds) or secondary bonds (e.g., hydrogen or van der Waals bonds). As another example, the coating is treated to increase the strength of at least some of the bonds between the fluorinated material and the adhesion layer or the external surface of the housing. For example, the treatment may form a greater amount of primary bonds than were present prior to the treatment. If heat is applied to the coating to increase the bonding, the coating is typically treated at a temperature below which degradation of the fluorinated material occurs. As a further example, the atmosphere surrounding the coating may be controlled to maintain appropriate levels of humidity and/or oxygen during bonding of the coating to the adhesion layer or the external surface of the housing.

In further embodiments, a second fluorinated material different from the first material may be deposited on the adhesion layer in a similar fashion as described above For example the second fluorinated material may be a branched fluorinated material while the first fluorinated material may be a linear fluorinated material. The second fluorinated material may further be treated to increase the bonding between the second fluorinated material and the adhesion layer or the external surface of the housing as described above.

Typically, the process further includes an operation of removing the mask. In further embodiments, a rinsing or washing operation may be included to remove excess and/or weakly bonded fluorinated material. For example, the rinsing operation may comprise rinsing the coating in an organic liquid. The organic liquid may be capable of solvating the excess/weakly bonded oligomer or polymer molecules without substantially disturbing the well bonded oligomer or polymer molecules. For example, the organic liquid may be an alcohol.

Figure 10:
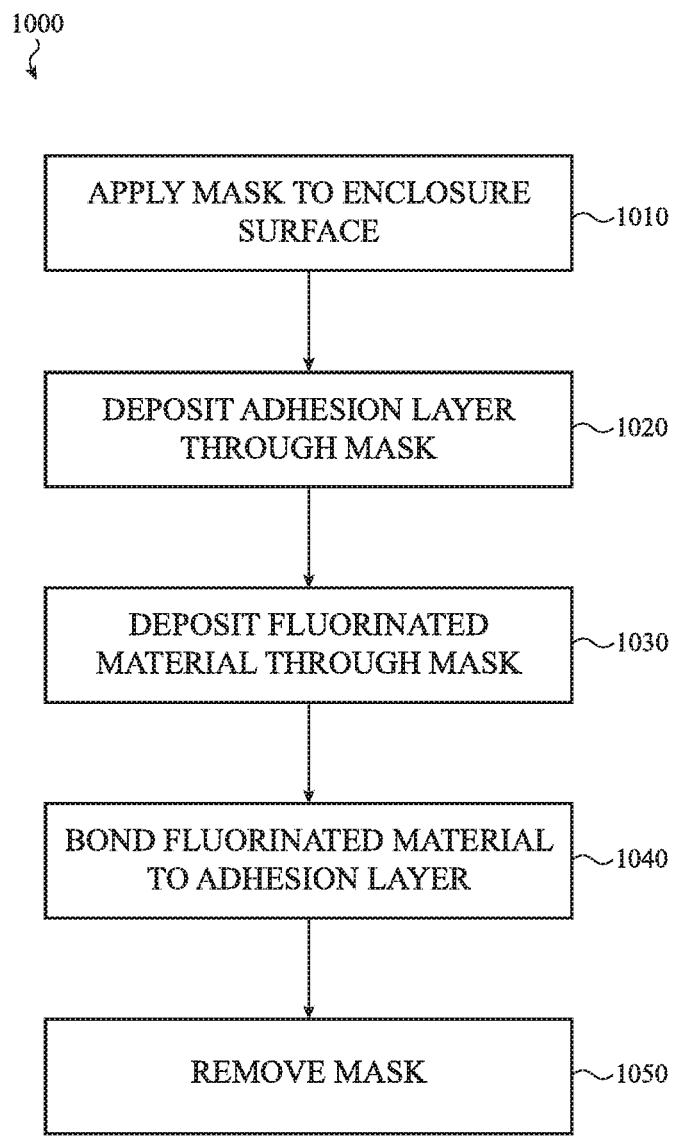
FIG. 10 shows a flowchart of another example process for making a patterned coating.

FIG. 10 schematically illustrates process 1000 for making a patterned coating. As shown, process 1000 involves depositing both the adhesion layer and the fluorinated material through a mask. Process 1000 may be used for making the patterned coatings of FIGS. 2A, 2C, 3-5, and 6A.

Process 1000 may include operation 1010 of applying a mask to an external surface of an enclosure. The mask may include an aperture pattern suitable for forming any patterned coating described herein. For example, the mask may include micro-scale apertures, each micro-scale aperture configured to produce a micro-scale region of the coating. As an additional example, the mask may include connected apertures configured to produce connected regions of the coating. As previously discussed with respect to process 900, the mask is typically compatible with operation 1020 of depositing an adhesion layer and operation 1030 of depositing a fluorinated material. In embodiments, the mask is formed of or includes a metal, of silicon, of silicon nitride ($SiN_x$), or of a polymer.

Process 1000 may further include operation 1020 of depositing an adhesion layer through the mask. In embodiments, the adhesion layer is deposited using a vapor deposition technique, such as a physical vapor deposition (PVD) technique or a chemical vapor (CVD) deposition technique. The resulting adhesion layer has a pattern determined by the apertures of the mask. For example, a patterned adhesion layer may comprise multiple micro-scale regions; the regions of the adhesion layer may be discrete, connected, or combinations thereof.

Process 1000 may further include operation 1030 of depositing a fluorinated material through the mask. The fluorinated material may be deposited using vapor deposition. For example, the fluorinated material may be deposited using a physical vapor deposition process such as a liquid vaporization process. The fluorinated material may be any suitable linear fluorinated material described herein.

Process 1000 may optionally include operation 1040 of bonding the fluorinated material to the adhesion layer. For example, when the fluorinated material includes least one functional group to facilitate attachment of the fluorinated material operation 1040 may comprise forming a bond between the fluorinated material and the adhesion layer. For example, a fluorinated oligomer or polymer molecule may form at least one of a primary bond or a secondary bond with the adhesion layer. In some embodiments, operation 1040 may occur concurrently with operation 1030.

Process 1000 may further include operation 1050 of removing the mask. In some embodiments, the mask may simply be lifted away from the patterned adhesion layer and the patterned coating.

FIGS. 11A-11F schematically illustrate several stages in a process in which a fluorinated material is deposited through a mask to make a patterned coating. FIGS. 11A-11F provide partial cross-sectional views of an example substrate, mask, and coating regions.

Figure 11A:
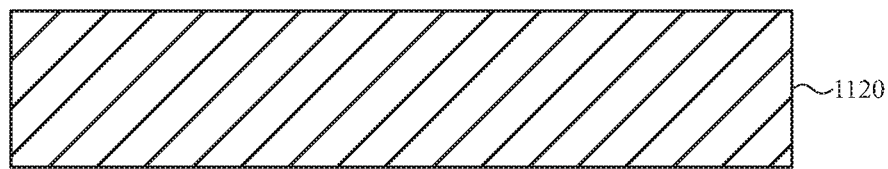
FIGS. 11A, 11B, 11C, 11D, 11E, and 11F show stages in a process for making a patterned coating.
Figure 11B:
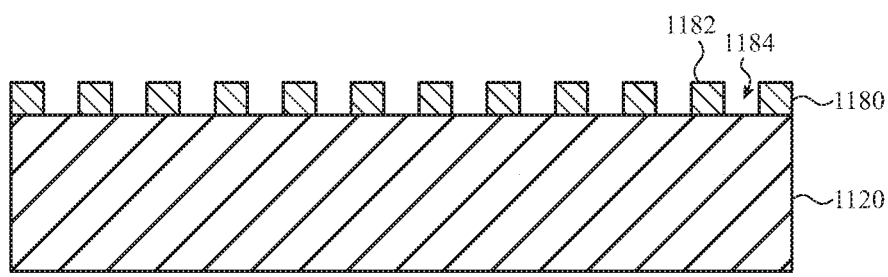

FIG. 11A shows substrate 1120 prior to the start of the process. As previously described, substrate 1120 may be a cover member. FIG. 11B illustrates substrate 1120 after application of mask 1180. As shown, mask 1180 defines a regular series of mask features 1182 and mask apertures 1184.

Figure 11C:
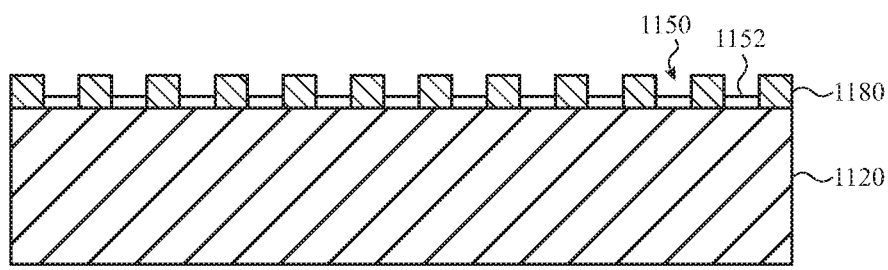

FIG. 11C shows substrate 1120 after adhesion layer 1150 has been deposited through the mask 1180 (e.g., after operation 1020 of FIG. 10). The adhesion layer 1150 comprises multiple regions 1152. Each of the regions 1152 at least partially fills a mask aperture 1184. The mask features 1182 produce a spacing between regions 1152 of the adhesion layer.

Figure 11D:
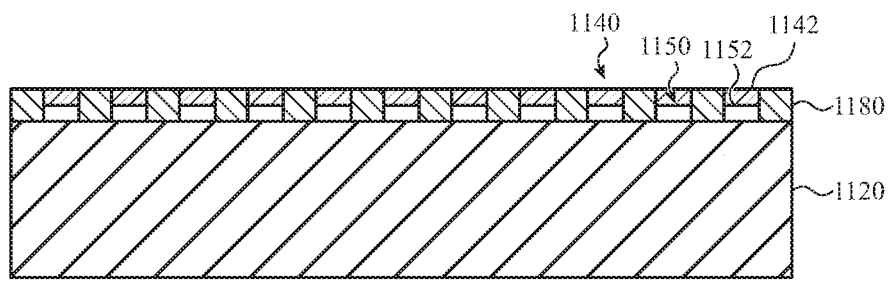
Figure 11E:
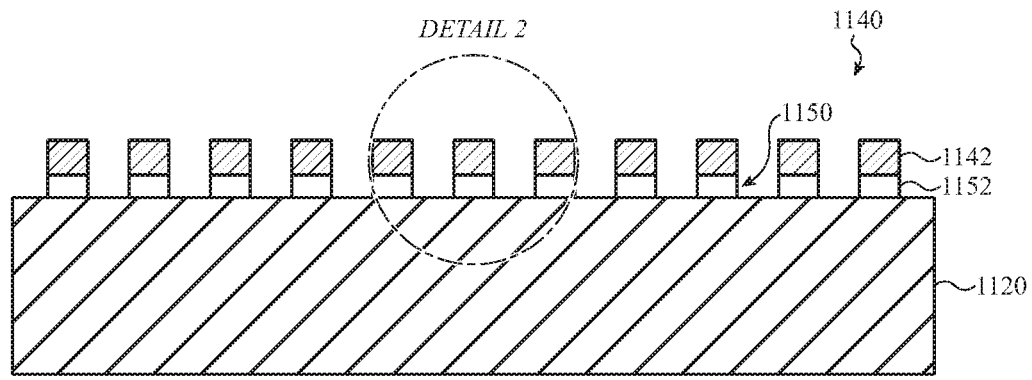

FIG. 11D shows substrate 1120 after a fluorinated material has been deposited through the mask to form regions 1142 of the coating 1140 (e.g., after operation 1030 of FIG. 10). FIG. 11E shows the patterned coating 1140 and patterned adhesion layer 1150 on substrate 1120 after the mask 1180 has been removed (e.g., after operation 1050 of FIG. 10). Patterned coating 1140 comprises regions 1142 and patterned adhesion layer 1150 comprises regions 1152. The mask features 1182 produce a spacing between patterned coating regions 1142.

Figure 11F:
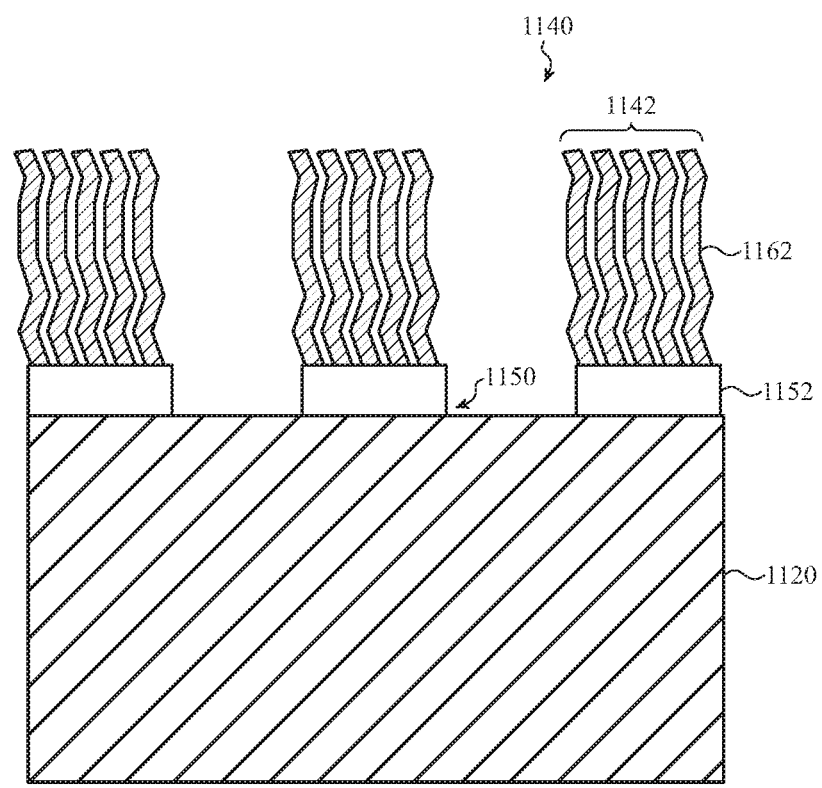

FIG. 11F shows an enlarged view of detail 2 in FIG. 11E. As shown in FIG. 11F, each region 1142 of the coating 1140 comprises multiple linear fluorinated oligomer or linear fluorinated polymer molecules 1162. Each of the linear fluorinated oligomer or linear fluorinated polymer molecules 1162 is attached to a region 1152 of the adhesion layer 1150. The adhesion layer 1150 is attached to substrate 1120. Although each of the linear fluorinated oligomer or polymer molecules 1162 in FIG. 11F is shown as having about the same length, in further embodiments the linear fluorinated oligomer or polymer molecules 1162 have a distribution of lengths consistent with the molecular weight distribution of the fluorinated oligomer or polymer. Similarly, the fluorinated molecules schematically shown in FIGS. 13G, 15B and 16B may have a distribution of lengths consistent with the molecular weight distribution of the fluorinated oligomer or polymer.

Figure 12:
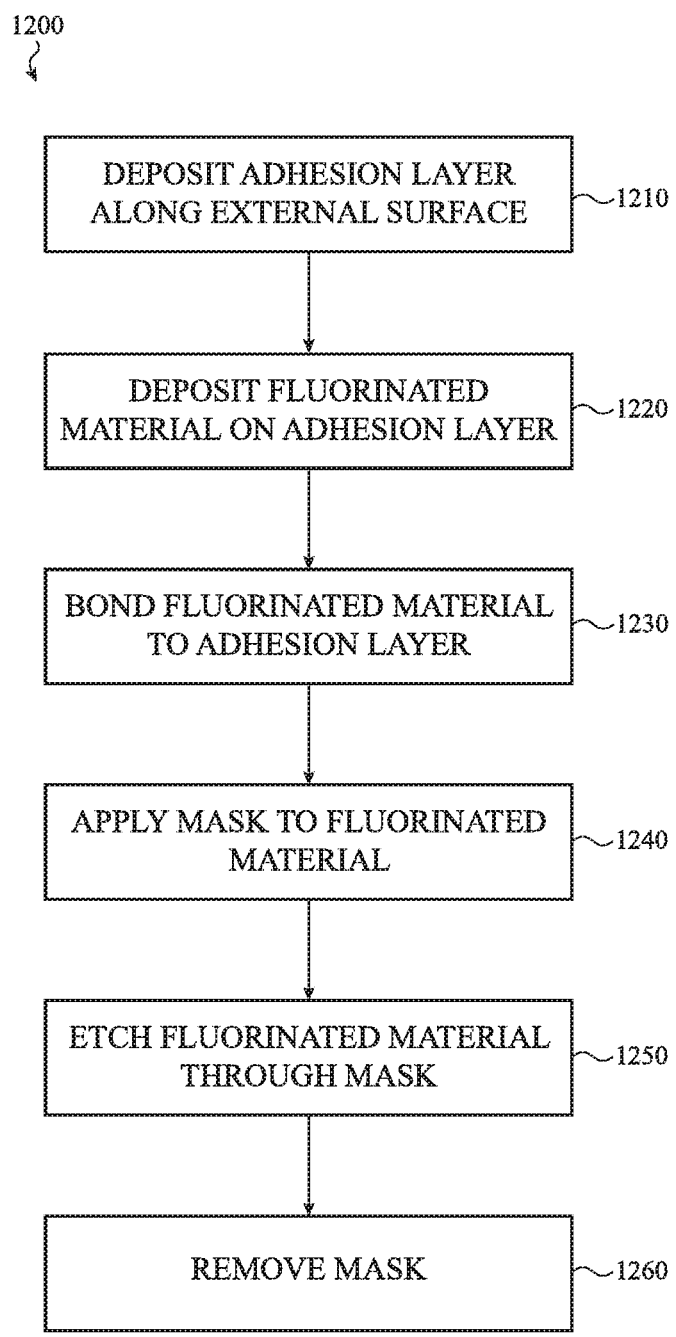
FIG. 12 shows a flowchart of an additional example process for making a patterned coating.

FIG. 12 schematically illustrates another example process 1200 for making a patterned coating. As shown, process 1200 includes an operation of etching a coating through a mask to form the patterned coating (1250). Process 1200 may be used for making the patterned coatings of FIGS. 2A, 2B and 3-5.

Process 1200 may include operation 1210 of depositing an adhesion layer along a surface of the enclosure of an electronic device. For example, the adhesion layer may be deposited along an external surface of a cover member. In embodiments, the adhesion layer is deposited using a vapor deposition technique, such as a physical vapor deposition (PVD) technique or a chemical vapor (CVD) deposition technique.

Process 1200 may further include operation 1220 of depositing a fluorinated material on the adhesion layer. The fluorinated material may be deposited through vapor deposition. For example, the fluorinated material may be deposited through a physical vapor deposition process such as a liquid vaporization process. The fluorinated material may be any suitable linear fluorinated material described herein.

Process 1200 may optionally include operation 1230 of bonding the fluorinated material to the adhesion layer. For example, when the fluorinated material includes least one functional group to facilitate attachment of the fluorinated material operation 1230 may comprise forming a bond between the fluorinated material and the adhesion layer. For example, a fluorinated oligomer or polymer molecule may form at least one of a primary bond or a secondary bond with the adhesion layer. In some embodiments, operation 1230 may occur concurrently with operation 1220. Typically, the product of operation 1230 is an unpatterned coating.

Process 1200 may further include operation 1240 of applying a mask to a surface of fluorinated material. The mask may include an aperture pattern suitable for forming any patterned coating described herein. For example, the mask may include micro-scale apertures, each micro-scale aperture configured to produce a spacing between regions or a micro-scale aperture in the coating. As an additional example, the mask may include connected apertures configured to produce connected apertures in the coating. As previously discussed with respect to process 900, the mask is typically compatible with operation 1250 of etching the fluorinated material through the mask. In embodiments, the mask is formed of or includes a metal, of silicon, or of silicon nitride (SiN$_x$). In further embodiments, the mask is formed of or includes a polymer coated with another material having a greater resistance to etching, such as a metal, silicon, or silicon nitride.

Process 1200 may further include operation 1250 of etching the fluorinated material through the as shown, the linear fluorinated chain does not apertures in the mask. Suitable etching techniques include, but are not limited to, ion beam techniques or plasma techniques. In embodiments, the etching technique removes the fluorinated material but does not substantially remove the adhesion layer. Process 1200 may further include operation 1260 of removing the mask. In some embodiments, the mask may simply be lifted away from the patterned coating.

FIGS. 13A-13G schematically illustrate several stages in an example process in which a fluorinated material is etched through a mask to make a patterned coating. FIGS. 13A-13G provide partial cross-sectional views of the substrate, mask, and coating regions.

Figure 13A:
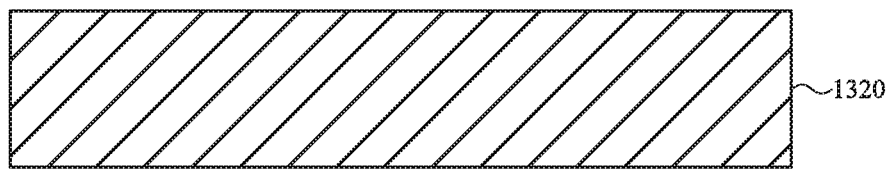
FIGS. 13A, 13B, 13C, 13D, 13E, 13F, and 13G show stages in a process for making a patterned coating.
Figure 13B:
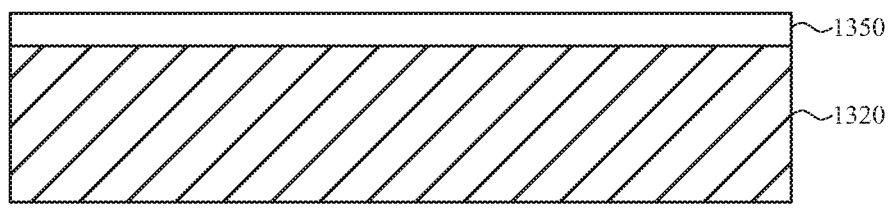
Figure 13C:
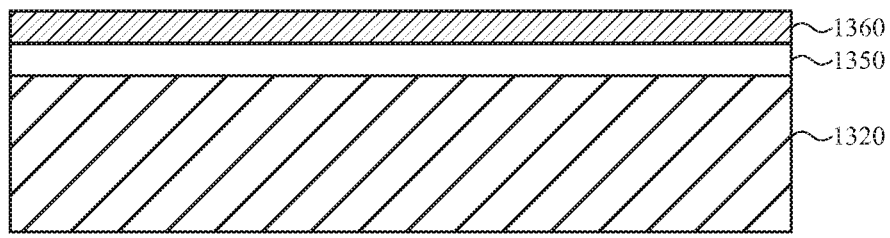

FIG. 13A shows substrate 1320 prior to the start of the process. As previously described, substrate 1320 may be a cover member of an electronic device. FIG. 13B illustrates substrate 1320 after application of adhesion layer 1350 (e.g., after operation 1210 of FIG. 12) and FIG. 13C shows substrate 1320 after a layer of a fluorinated material 1360 has been deposited on adhesion layer 1350 (e.g., after operation 1220 of FIG. 12).

Figure 13D:
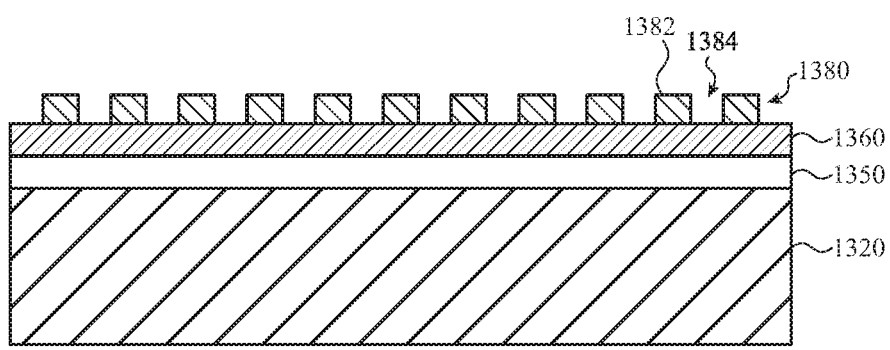

FIG. 13D shows substrate 1320 after mask 1380 has been applied to the layer of the fluorinated material 1360 (e.g., after operation 1240 of FIG. 12). As shown, mask 1380 defines a regular series of mask features 1382 and mask apertures 1384. The adhesion layer 1350 is also shown.

Figure 13E:
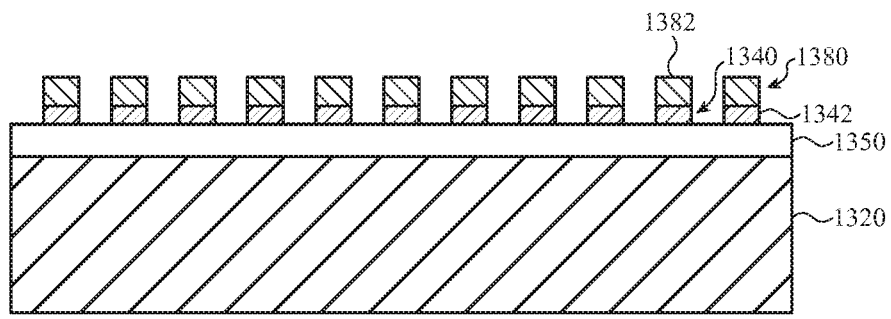

FIG. 13E shows substrate 1320 after the layer of the fluorinated material has been etched through the mask to form regions 1342 of the coating 1340 (e.g., after operation 1250 of FIG. 12). The mask apertures 1384 correspond to the spacing between regions 1342. As shown, the adhesion layer 1350 is not substantially etched during the process of etching the fluorinated material.

Figure 13F:
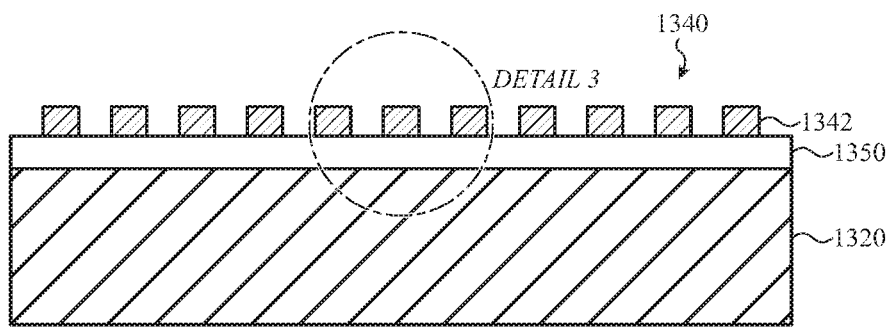

FIG. 13F shows the patterned coating 1340 and adhesion layer 1350 on substrate 1320 after the mask 1380 has been removed (e.g., after operation 1260 of FIG. 12). Patterned coating 1340 comprises regions 1342. As shown, regions 1342 are spaced apart from one another.

Figure 13G:
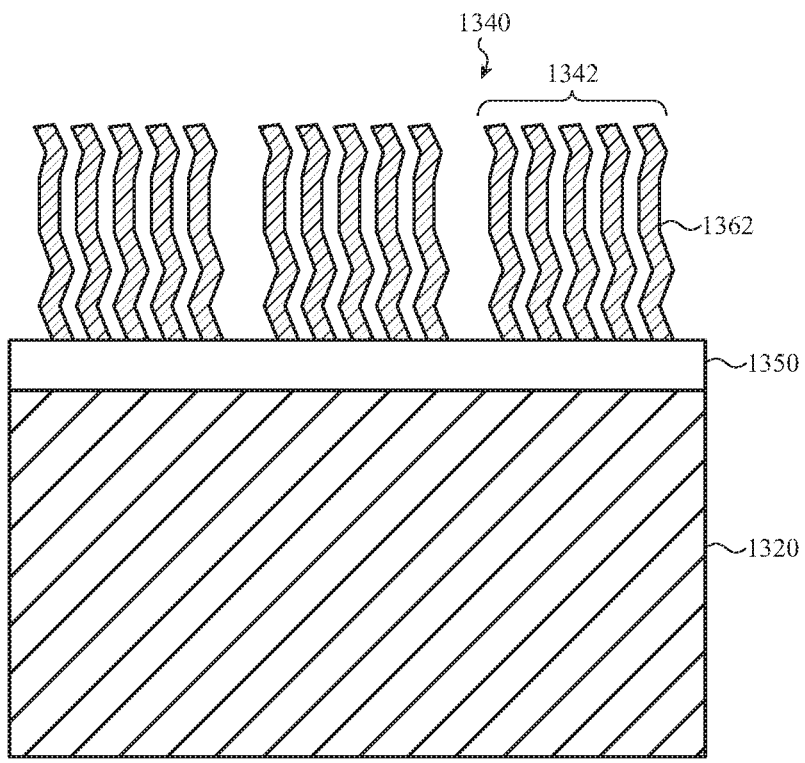

FIG. 13G shows an enlarged view of detail 3 in FIG. 13F. As shown in FIG. 13G, each region 1342 of the coating 1340 comprises multiple linear fluorinated oligomer or polymer molecules 1362. Each of the linear fluorinated oligomer or linear fluorinated polymer molecules 1362 is attached to adhesion layer 1350. The adhesion layer 1350 is attached to substrate 1320.

Figure 14:
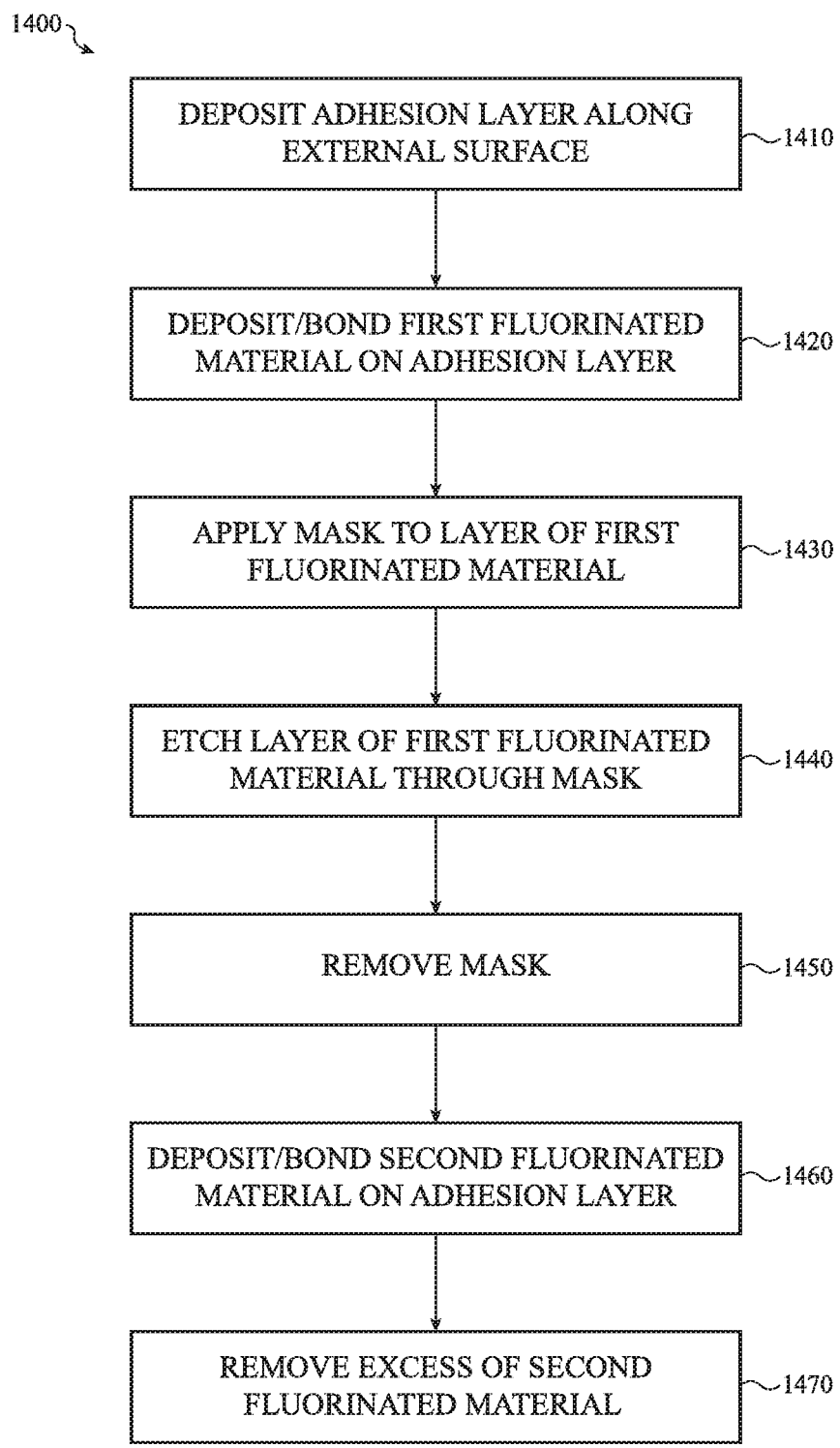
FIG. 14 shows a flowchart of an example process for making a patterned coating including two different materials.

FIG. 14 schematically illustrates an example process 1400 for making a patterned coating including two different fluorinated materials. Process 1400 may be used for making the patterned coatings of FIGS. 6A and 6B.

Process 1400 may include operation 1410 of depositing an adhesion layer along an external surface of the enclosure of an electronic device. For example, the adhesion layer may be deposited along an external surface of a cover member. In embodiments, the adhesion layer is deposited using a vapor deposition technique, such as a physical vapor deposition (PVD) technique or a chemical vapor (CVD) deposition technique.

Process 1400 may further include operation 1420 of depositing and bonding a first fluorinated material on the adhesion layer. The first fluorinated material may be deposited through vapor deposition. For example, the first fluorinated material may be deposited through a physical vapor deposition process such as a liquid vaporization process. The first fluorinated material may be any suitable linear fluorinated material described herein. The first fluorinated material may be bonded to the adhesion layer as previously described with respect to methods 900, 1000, and 1200. For example, operation 1420 may comprise forming a bond between the first fluorinated material and the adhesion layer.

Process 1400 may further include operation 1430 of applying a mask to a surface of fluorinated material. The mask may include an aperture pattern suitable for forming any patterned coating described herein. For example, the mask may include micro-scale apertures, each micro-scale aperture configured to produce a spacing between regions or a micro-scale aperture in the coating. As an additional example, the mask may include connected apertures configured to produce connected apertures in the coating. The mask materials may be as previously discussed with respect to processes 900 and 1200.

Process 1400 may further include operation 1440 of etching the first fluorinated material through apertures of the mask. Suitable etching techniques include, but are not limited to, ion beam techniques or plasma techniques. In embodiments, the etching technique removes the first fluorinated material but does not substantially remove the adhesion layer. Etching of the first fluorinated material through the apertures in the mask produces the spacing between regions of the first fluorinated material and exposes regions of the adhesion layer.

Process 1400 may further include operation 1450 of removing the mask. In embodiments, the operation of removing the mask precedes operation 1460. In further embodiments, the operation of removing the mask follows operation 1460.

Process 1400 further includes operation 1460 of depositing and bonding the second fluorinated material to the exposed regions of the adhesion layer. The second fluorinated material may be deposited through vapor deposition. For example, the second fluorinated material may be deposited through a physical vapor deposition process such as a liquid vaporization process. The second fluorinated material may be any suitable branched fluorinated material described herein. The second fluorinated material may be bonded to the exposed regions of adhesion layer as previously described with respect to methods 900, 1000, and 1200. For example, operation 1460 may comprise forming a bond between the second fluorinated material and the adhesion layer.

Operation 1460 may produce a patterned coating that defines first regions of the first fluorinated material and second regions of the second fluorinated material. The first regions are generally determined by the features of the mask and the second regions generally determined by the apertures of the mask. It is not required that the second regions exactly correspond to the apertures of the mask to produce the patterned coating.

Process 1400 may further include operation 1470 of removing excess amounts of the second fluorinated material. For example, during operation 1460 the second fluorinated material may be deposited over the first fluorinated material as well as the adhesion layer. However, the second fluorinated material is typically not bonded or only weakly bonded to the first fluorinated material during operation 1460. In embodiments, operation 1470 comprises rinsing or washing the patterned coating to remove unbonded and weakly bonded molecules of the second fluorinated material. The rinsing or washing operation may be as previously described for process 900.

Figure 15A:
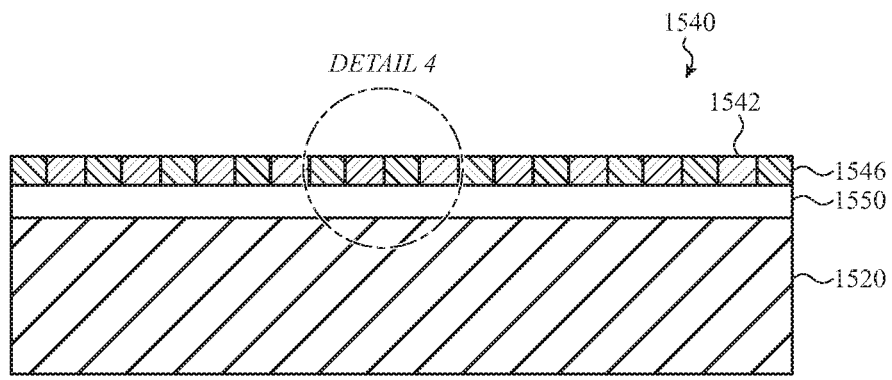
FIGS. 15A and 15B schematically show partial cross-sectional views of an example patterned coating including two different materials.

FIG. 15A shows a patterned coating 1540 including first regions 1542 of a first fluorinated material and second regions 1546 of a second fluorinated material. The first fluorinated material may comprise a linear fluorinated oligomer or linear fluorinated polymer. The second fluorinated material may comprise a branched fluorinated oligomer or polymer. Both first regions 1542 and second regions 1546 are attached to adhesion layer 1550 on substrate 1520. As previously discussed, the substrate may be a cover member of an electronic device.

Figure 15B:
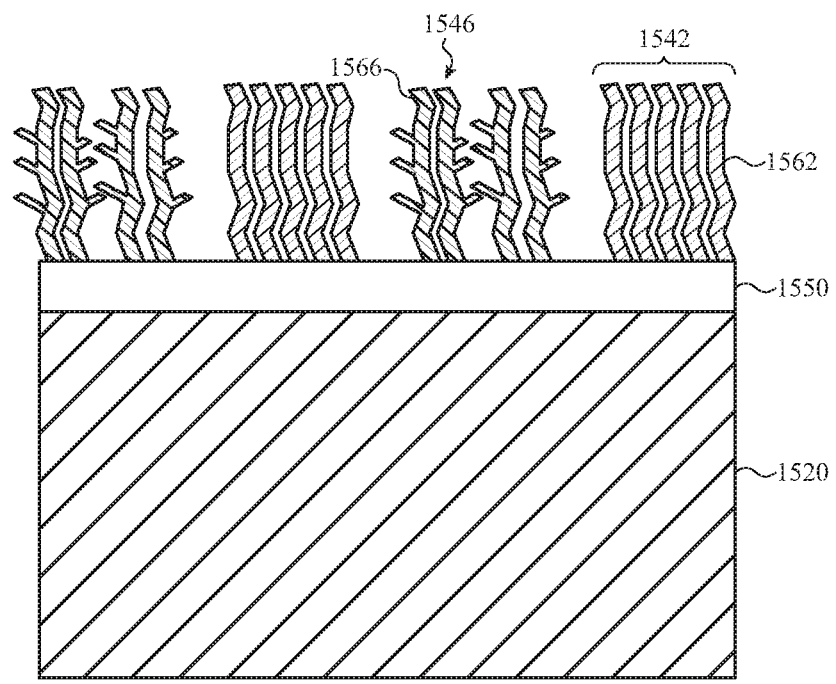

FIG. 15B shows an enlarged view of detail 4 in FIG. 15A. As shown in FIG. 15B, each region 1542 of the first fluorinated material comprises multiple linear fluorinated oligomer or linear fluorinated polymer molecules 1562. Each of the linear fluorinated oligomer or linear fluorinated polymer molecules 1562 is attached to adhesion layer 1550. In addition, each region 1546 of the second fluorinated material comprises multiple branched fluorinated oligomer or branched fluorinated polymer molecules 1563. Each of the branched fluorinated oligomer or branched fluorinated polymer molecules 1563 is attached to adhesion layer 1550. The adhesion layer 1550 is attached to substrate 1520.

In additional aspects, the disclosure provides methods for making plasma-treated coatings. An example method comprises the operations of depositing an adhesion layer along an external surface of an electronic device, depositing a fluorinated material on the adhesion layer, bonding the fluorinated material to the adhesion layer, and plasma treating the fluorinated material. The operation of depositing an adhesion layer may be similar to that described for operation 1210, the operation of depositing a fluorinated material on the adhesion layer may be similar to that described for operation 1220, and the operation of bonding the fluorinated material to the adhesion layer may be similar to that described for operation 1230 of process 1200. The method may optionally include a rinsing or washing operation similar to that described for process 900.

In embodiments, the fluorinated material may be treated with a plasma in which the pressure is approximately the same as that of the surrounding atmosphere (i.e., an atmospheric-pressure plasma). In embodiments, the gas used to form the plasma may comprise one or more substantially inert gases (e.g., argon, helium) so that the plasma is based on the inert gas(es). In additional embodiments, the gas used to form the plasma may comprise oxygen, nitrogen, air, or a mixture of air with an inert gas. The plasma may be a low-temperature or "cold" plasma. In embodiments, a cold plasma operates at a temperature of 80° C. or less, 70° C. or less, 60° C. or less, or 50° C. or less. In embodiments, the power is from 50 W to 300 W, 100 W to 300 W, or from 150 W to 250 W. The exposure time may be less than 1 second, less than 0.5 second, from 0.01 seconds to 0.5 seconds, or from 0.05 seconds to 0.5 seconds.

As previously described, plasma treatment of the fluorinated material can modify the fluorinated material in several ways. When the fluorinated material forms a substantially continuous coating prior to plasma treatment, plasma treatment of the fluorinated material may reduce the thickness of the coating. As the thickness of the coating decreases, the length and molecular weight of the fluorinated oligomer or polymer molecules also generally decreases. In embodiments, the coating remains substantially continuous after plasma treatment.

Plasma treatment may also modify the surface composition and/or the surface topography of the coating. For example, when species in the plasma have sufficiently high kinetic energy, covalent bonds in the fluorinated oligomer or polymer molecules may be broken. Under some conditions, such as in the presence of oxygen, an oxidation reaction can occur at the surface of the fluorinated material. Changes in the surface composition of the coating may be measured by various spectroscopic techniques. Furthermore, plasma treatment may also produce a measurable increase in surface roughness.

In embodiments, the effect of plasma treatment may be measured by the initial contact angle (prior to abrasion testing), the contact angle after a specified number of cycles of abrasion testing, or a combination thereof. For example, the initial contact angle of water on the plasma-treated fluorinated material may be greater than or equal to 100 degrees, greater than or equal to 105 degrees, or greater than or equal to 110 degrees. As additional examples, the initial contact angle of water on the fluorinated material may be less than 180 degrees, from 100 degrees to 130 degrees, or from 105 degrees to 150 degrees. In some embodiments, the initial contact angle of water on the plasma-treated fluorinated material may be less than the initial contact angle of water on the fluorinated material without plasma treatment. In addition, the contact angle of water on the fluorinated material as measured after the specified number of abrasion testing cycles may be greater than or equal to 90 degrees. For example, the specified number of abrasion testing cycles may be 2000, 3000, 4000, 5000, 6000, or 7000 using an abrasion testing apparatus as described herein.

Figure 16A:
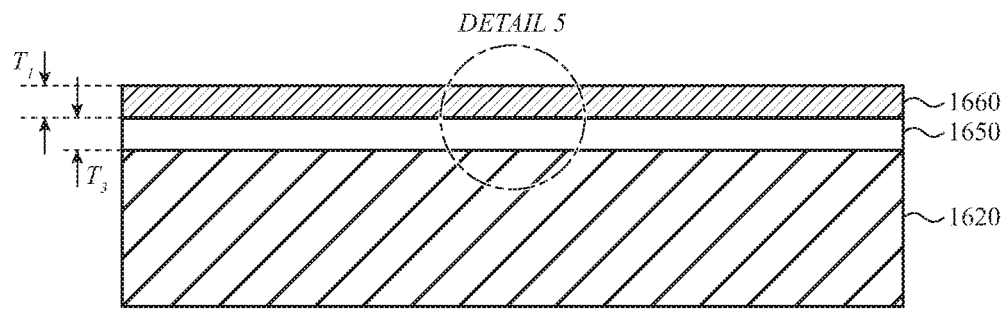
FIGS. 16A, 16B, 16C, and 16D show stages in a process for making a plasma-treated coating.

FIGS. 16A, 16B, 16C, and 16D show stages in a process for making a plasma-treated coating. FIG. 16A shows substrate 1620 after a layer of a fluorinated material 1660 has been deposited on adhesion layer 1650. The layer of the fluorinated material 1660 is substantially continuous. For example, a substantially continuous layer may be substantially nonporous and may exclude micro-sized gaps in the coatings. In some cases, the layer is continuous over at least a display area of a device, or over an entire front or back exterior surface of the device. In some cases, the layer is continuous over all of the exterior surfaces of a device. In some cases, the layer is continuous (e.g., has no gaps, apertures, etc.) for at least an area of about 3 in$^2$, about 4 in$^2$, about 5 in$^2$, about 6 in$^2$, or a larger area.

The fluorinated material may be any suitable linear fluorinated material described herein. In embodiments, the adhesion layer comprises an inorganic material. As examples, the adhesion layer may comprise a silicon oxide, such as silicon dioxide, or consist essentially of silicon dioxide.

In embodiments, adhesion layer 1650 is thin relative to the layer of fluorinated material 1660. For example, thickness $T_1$ of the layer of fluorinated material 1660 may be at least twice thickness $T_3$ of the adhesion layer 1650. In embodiments, thickness $T_3$ of the adhesion layer is 10 nm or less, such as from 1 nm to 10 nm or from 1 nm to 5 nm. In embodiments, the thickness $T_1$ of the layer of fluorinated material 1660 is from 5 to 20 nm or from 10 to 50 nm.

Figure 16B:
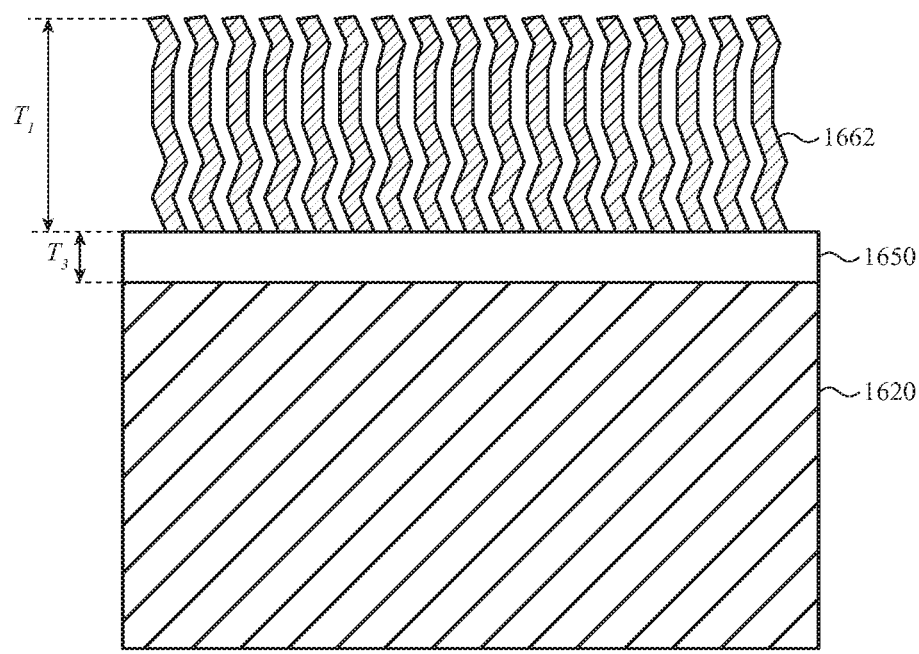

FIG. 16B shows an enlarged view of detail 5 in FIG. 16A. The layer comprises multiple linear fluorinated oligomer or polymer molecules 1662 as schematically illustrated in FIG. 16B. Each of the linear fluorinated oligomer or linear fluorinated polymer molecules 1662 is attached to adhesion layer 1650. The adhesion layer 1650 is attached to substrate 1620.

Figure 16C:
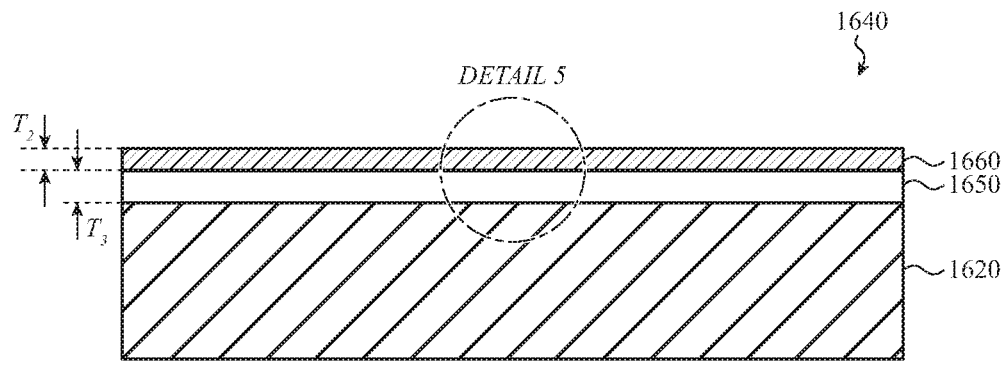

FIG. 16C schematically shows a plasma-treated layer of the fluorinated material 1660 on adhesion layer 1650. The layer of the fluorinated material 1660 is substantially continuous (e.g., having no gaps, openings, or apertures along at least one contiguous area), but has a thickness $T_2$ which is less than the initial thickness $T_1$. In embodiments, the difference in thickness between $T_2$ and $T_1$ may be greater than 0.1 nm. In further embodiments, the difference in thickness may be less than 5 nm, less than 2 nm, less than 1 nm, or less than 0.5 nm.

Figure 16D:
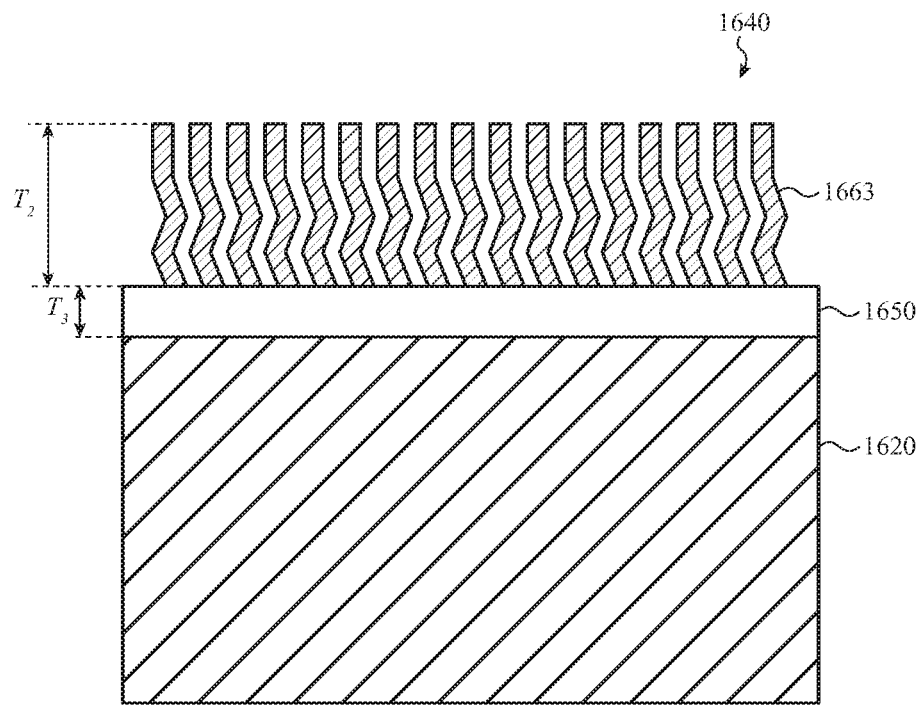

FIG. 16D shows an enlarged view of detail 6 in FIG. 16C. The layer comprises multiple linear fluorinated oligomer or polymer molecules 1663 as schematically illustrated in FIG. 16D. Each of the linear fluorinated oligomer or linear fluorinated polymer molecules 1663 is attached to adhesion layer 1650. The adhesion layer 1650 is attached to substrate 1620. As shown, the length of linear fluorinated oligomer polymer molecules 1663 may be generally less than that of linear fluorinated oligomer or polymer molecules 1662. Although not shown in FIG. 16D, in additional embodiments, the linear fluorinated oligomer or polymer molecules 1663 may have a greater variation in length after plasma treatment than was present for linear fluorinated oligomer or polymer molecules 1662. For example, the greater variation in length may be due to variations in etching of the linear fluorinated oligomer or polymer molecules 1662. Therefore, in embodiments plasma treatment of the layer of the fluorinated material 1660 may lead to an increase in surface roughness and an increase in the coefficient of friction.

In addition, the plasma treatment may cause the surface composition of linear fluorinated oligomer or polymer molecules 1663 to be different than that of linear fluorinated oligomer or polymer molecules 1662. In some embodiments, the difference in surface composition may increase the adhesion strength of between the plasma-treated coating and another surface, thereby increasing the coefficient of friction between the plasma-treated coating and the other surface. For example, degradation and/or oxidation of the linear fluorinated oligomer polymer molecules 1662 may result in moieties near the (surface) end of linear fluorinated oligomer or polymer molecules 1663 which have a stronger interaction with the other surface. For example, these moieties may include a lesser amount of fluorine than moieties near the (surface) end of linear fluorinated oligomer or polymer molecules 1662 or may not include fluorine.

Figure 17:
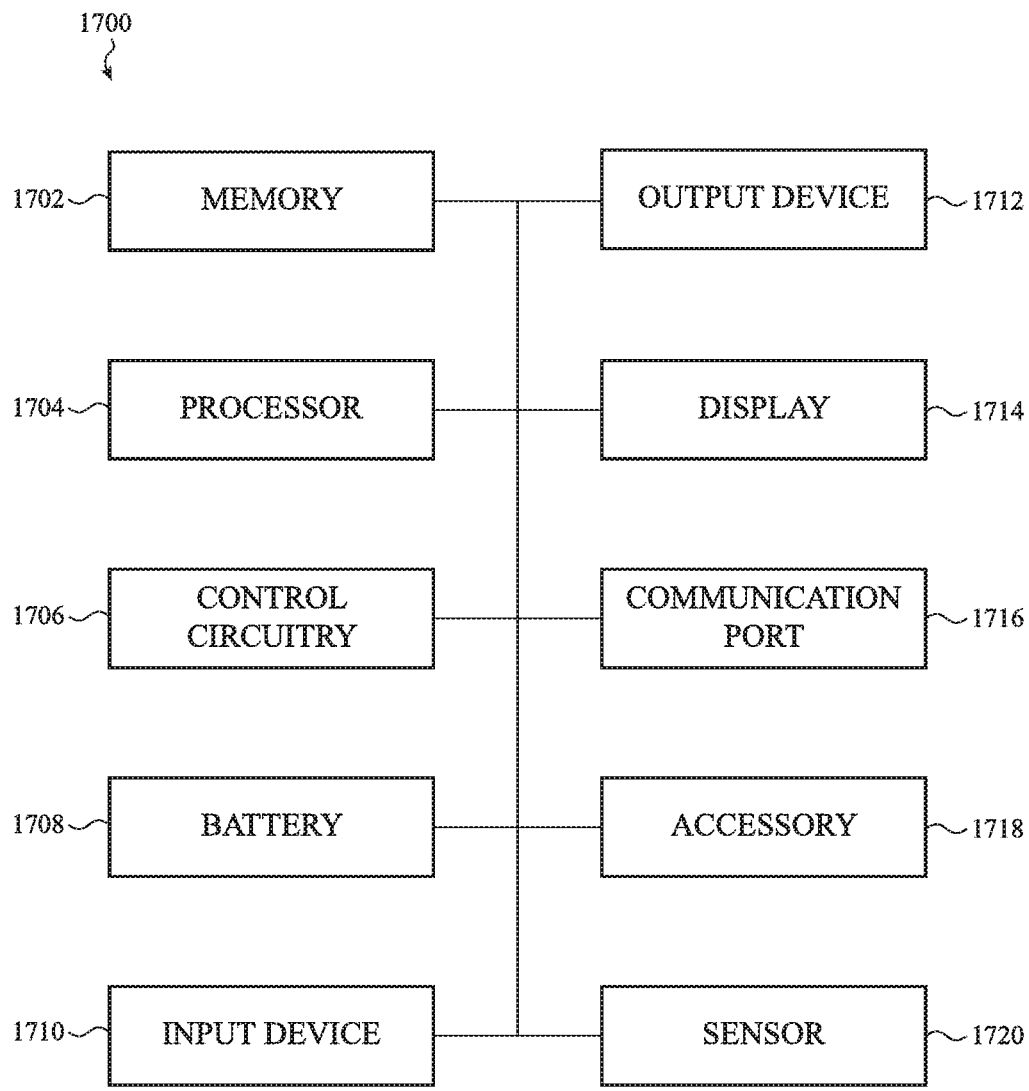
FIG. 17 shows a block diagram of components of an electronic device.

FIG. 17 shows a block diagram of components of an electronic device. The schematic representation depicted in FIG. 17 may correspond to components of the devices depicted in FIG. 1A-16D as described above. However, FIG. 17 may also more generally represent other types of electronic devices with an enclosure component as described herein.

The electronic device 1700 includes a processor 1704 operably connected with a computer-readable memory 1702. The processor 1704 may be operatively connected to the memory 1702 component via an electronic bus or bridge. The processor 1704 may be implemented as one or more computer processors or microcontrollers configured to perform operations in response to computer-readable instructions. The processor 1704 may include a central processing unit (CPU) of the device 1700. Additionally and/or alternatively, the processor 1704 may include other electronic circuitry within the device 1700 including application specific integrated chips (ASIC) and other microcontroller devices. The processor 1704 may be configured to perform functionality described in the examples above.

The memory 1702 may include a variety of types of non-transitory computer-readable storage media, including, for example, read access memory (RAM), read-only memory (ROM), erasable programmable memory (e.g., EPROM and EEPROM), or flash memory. The memory 1702 is configured to store computer-readable instructions, sensor values, and other persistent software elements.

The electronic device 1700 may include control circuitry 1706. The control circuitry 1706 may be implemented in a single control unit and not necessarily as distinct electrical circuit elements. As used herein, "control unit" will be used synonymously with "control circuitry." The control circuitry 1706 may receive signals from the processor 1704 or from other elements of the electronic device 1700.

As shown in FIG. 17, the electronic device 1700 includes a battery 1708 that is configured to provide electrical power to the components of the electronic device 1700. The battery 1708 may include one or more power storage cells that are linked together to provide an internal supply of electrical power. The battery 1708 may be operatively coupled to power management circuitry that is configured to provide appropriate voltage and power levels for individual components or groups of components within the electronic device 1700. The battery 1708, via power management circuitry, may be configured to receive power from an external source, such as an alternating current power outlet. The battery 1708 may store received power so that the electronic device 1700 may operate without connection to an external power source for an extended period of time, which may range from several hours to several days. In addition, the battery 1708 may be configured to receive power through a wireless charging component internal to the electronic device. Further, the battery may be configured to deliver power through the wireless charging component to a separate electronic device (e.g., a wearable electronic device).

In some embodiments, the electronic device 1700 includes one or more input devices 1710. The input device 1710 is a device that is configured to receive input from a user or the environment. The input device 1710 may include, for example, a push button, a touch-activated button, a touch screen (e.g., a touch-sensitive display or a force-sensitive display), capacitive touch button, dial, crown, or the like. In some embodiments, the input device 1710 may provide a dedicated or primary function, including, for example, a power button, volume buttons, home buttons, scroll wheels, and camera buttons.

In some embodiments, the electronic device 1700 includes one or more output devices 1712 configured to provide output to a user. The output device 1712 may include display 1714 that renders visual information generated by the processor 1704. The output device 1712 may also include one or more speakers to provide audio output.

The display 1714 may be capable of producing high-resolution graphical output. The display 1714 may include a liquid-crystal display (LCD), light-emitting diode, organic light-emitting diode (OLED) display, an active layer organic light emitting diode (AMOLED) display, organic electroluminescent (EL) display, electrophoretic ink display, or the like. If the display 1714 is a liquid-crystal display or an electrophoretic ink display, the display 1714 may also include a backlight component that can be controlled to provide variable levels of display brightness. If the display 1714 is an organic light-emitting diode or organic electroluminescent type display, the brightness of the display 1714 may be controlled by modifying the electrical signals that are provided to display elements. In addition, information regarding configuration and/or orientation of the electronic device may be used to control the output of the display.

The device 1700 may also include one or more sensors 1720, such as a force sensor, a capacitive sensor, an accelerometer, a barometer, a gyroscope, a proximity sensor, a light sensor, or the like. The sensors 1720 may be operably coupled to processing circuitry. In some embodiments, the sensor 1720 may be a touch sensor that is configured to detect or estimate a location of a touch along an exterior surface of a cover member of the electronic device. For example, the touch sensor may be positioned below the cover member and may comprise an array of capacitive electrodes. A touch sensor in combination with the display 1714 may define a touchscreen or a touch-sensitive display.

In some embodiments, the sensors 1720 may position and/or orientation of the electronic device and be operably coupled to processing circuitry. Example sensors 1720 for this purpose include accelerometers, gyroscopes, magnetometers, and other similar types of position/orientation sensing devices. In addition, the sensors 1720 may include a microphone, acoustic sensor, light sensor, optical facial recognition sensor, or other types of sensing device.

In embodiments, an electronic device 1700 may include sensors 1720 to provide information regarding configuration and/or orientation of the electronic device in order to control the output of the display. For example, a portion of the display 1714 may be turned off, disabled, or put in a low energy state when all or part of the viewable area of the display 1714 is blocked or substantially obscured. As another example, the display 1714 may be adapted to rotate the display of graphical output based on changes in orientation of the device 1700 (e.g., 90 degrees or 180 degrees) in response to the device 1700 being rotated.

The electronic device 1700 may also include a communication port 1716 that is configured to transmit and/or receive signals or electrical communication from an external or separate device. The communication port 1716 may be configured to couple to an external device via a cable, adaptor, or other type of electrical connector. In some embodiments, the communication port 1716 may be used to couple the electronic device to a host computer.

The electronic device 1700 may also include at least one accessory 1718, such as a camera, a flash for the camera, or other such device. The camera may be connected to other parts of the electronic device 1700 such as the control circuitry 1706.

As used herein, the terms "about", "approximately," "substantially," and "substantially equal to" are used to account for relatively small variations, such as a variation of +/−10%, +/−5%, or +/−2%.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
   a display;
   an enclosure at least partially surrounding the display and defining an outer surface;
   an adhesion layer on the outer surface; and
   a patterned coating bonded to the adhesion layer and defining a network of interconnected regions comprising a linear fluorinated material, the network of interconnected regions defining apertures having a size ranging from 10 μm to 75 μm.

2. The electronic device of claim 1, wherein the network of interconnected regions has the form of a grid, the grid defining gridlines having a lateral dimension ranging from 10 μm to 75 μm.

3. The electronic device of claim 1, wherein:
   the patterned coating defines a first pattern;
   the adhesion layer defines a second pattern substantially the same as the first pattern; and
   the apertures expose the outer surface of the enclosure.

4. The electronic device of claim 1, wherein the patterned coating is oleophobic.

5. The electronic device of claim 1, wherein the network of interconnected regions comprising the linear fluorinated material is disposed over about 20% to about 80% of an area spanned by the adhesion layer.

6. The electronic device of claim 1, wherein:
   the linear fluorinated material comprises linear fluorinated oligomer molecules or linear fluorinated polymer molecules; and
   the linear fluorinated oligomer molecules or the linear fluorinated polymer molecules comprise perfluoropolyether repeat units.

7. The electronic device of claim 1, further comprising a wireless charging component within the enclosure.

8. The electronic device of claim 1, wherein:
   the patterned coating has a coefficient of friction greater than that of a continuous coating of the linear fluorinated material; and
   the patterned coating is disposed on a glass enclosure component.

9. An electronic device comprising:
   a display;
   an enclosure comprising a glass cover member;
   a touch sensor at least partially within the enclosure and configured to detect touch inputs applied to a surface of the enclosure; and
   a patterned coating positioned along an outer surface of the glass cover member and defining a set of distinct micro-scale regions, each micro-scale region of the set of distinct micro-scale regions including a linear fluorinated oligomer and having a lateral dimension, parallel to the glass cover member, ranging from 10 μm to 75 μm, and each pair of adjacent micro-scale regions of the set of distinct micro-scale regions separated from one another by a micro-scale spacing less than or equal to the lateral dimension of each of the pair of adjacent micro-scale regions.

10. The electronic device of claim 9, wherein the micro-scale regions of the set of distinct micro-scale regions are arranged in a grid pattern.

11. The electronic device of claim 10, wherein each of the micro-scale regions of the set of distinct micro-scale regions has a square shape.

12. The electronic device of claim 10, wherein each of the micro-scale regions of the set of distinct micro-scale regions has a circular shape.

13. The electronic device of claim 9, wherein:
   the patterned coating is bonded to an adhesion layer along the outer surface of the glass cover member; and
   the micro-scale regions of the set of distinct micro-scale regions are disposed over about 20% to about 80% of an area of the adhesion layer.

14. The electronic device of claim 9, wherein:
   the glass cover member is a first glass cover member defining a first side of the electronic device; and
   the enclosure further comprises a second glass cover member defining a second side of the electronic device opposite the first side.

15. A cover glass for an electronic device comprising:
   an outer surface;
   an adhesion layer on the outer surface; and
   a coating on the adhesion layer and comprising:
      a network of interconnected first regions comprising a linear fluorinated material, the network of interconnected first regions defining apertures having a size ranging from 10 μm to 75 μm; and one or more second regions comprising a branched fluorinated material, the one or more second regions positioned within the apertures.

16. The cover glass of claim 15, wherein the linear fluorinated material comprises linear fully fluorinated oligomer molecules, linear fully fluorinated polymer molecules, or a combination thereof.

17. The cover glass of claim 15, wherein the linear fluorinated material has a molecular weight from about 500 to about 10,000.

18. The cover glass of claim 17, wherein the branched fluorinated material has a molecular weight less than the molecular weight of the linear fluorinated material.

19. The cover glass of claim 15, wherein the coating has a thickness less than about 100 nm.

20. The cover glass of claim 15, wherein
the coating has a coefficient of friction greater than that of a continuous coating of the linear fluorinated material.

\* \* \* \* \*